United States Patent
Iwami

(10) Patent No.: US 10,162,174 B2
(45) Date of Patent: Dec. 25, 2018

(54) TRANSMISSIVE DISPLAY APPARATUS

(71) Applicant: FUJIFILM Corporation, Tokyo (JP)

(72) Inventor: Kazuchika Iwami, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 17 days.

(21) Appl. No.: 15/373,477

(22) Filed: Dec. 9, 2016

(65) Prior Publication Data

US 2017/0168295 A1   Jun. 15, 2017

(30) Foreign Application Priority Data

Dec. 9, 2015   (JP) ................. 2015-240408

(51) Int. Cl.
*G06T 5/00* (2006.01)
*G02B 27/01* (2006.01)
(Continued)

(52) U.S. Cl.
CPC ..... *G02B 27/0101* (2013.01); *G02B 27/0093* (2013.01); *G02B 27/017* (2013.01); *G06T 5/009* (2013.01); *G09G 3/20* (2013.01); *G09G 3/3406* (2013.01); *G02B 2027/0118* (2013.01); *G06T 2207/20208* (2013.01); *G09G 2320/066* (2013.01); *G09G 2320/0626* (2013.01);
(Continued)

(58) Field of Classification Search
None
See application file for complete search history.

(56) References Cited

U.S. PATENT DOCUMENTS 5,853,240 A  * 12/1998 Tanaka ............... G02B 27/0172
                                                          348/E5.141
8,749,478 B1 * 6/2014 Bowen ................... G09G 5/003
                                                          345/107
(Continued)

FOREIGN PATENT DOCUMENTS

JP       2013-174667         9/2013
JP     2013174667 A   *    9/2013

OTHER PUBLICATIONS

Barten, Peter GJ. "Formula for the contrast sensitivity of the human eye." In Image Quality and System Performance, vol. 5294, pp. 231-239. International Society for Optics and Photonics, 2003.*

*Primary Examiner* — Xiao M Wu
*Assistant Examiner* — Steven Z Elbinger
(74) *Attorney, Agent, or Firm* — JCIPRNET

(57) ABSTRACT

A display apparatus comprises a display device including an imagewise light emitting unit that emits imagewise light for displaying an input image, and a display surface member that includes a display surface that displays the input image as a displayed image, and transmits backside ambient light or reflects ambient light; an observation distance detecting section that detects an observation distance between the display surface and an observer; a display brightness acquiring section that acquires display brightness of the display device; an ambient light detecting section that detects the ambient light; and an image processing unit that performs image processing to adjust input spatial frequency characteristics of the input image based on the display brightness, the observation distance, and the ambient light such that display spatial frequency characteristics of the displayed image agree with target spatial frequency characteristics.

17 Claims, 8 Drawing Sheets

(51) Int. Cl.
  *G02B 27/00* (2006.01)
  *G09G 3/34* (2006.01)
  *G09G 3/20* (2006.01)
(52) U.S. Cl.
  CPC ... *G09G 2354/00* (2013.01); *G09G 2360/144* (2013.01); *G09G 2360/145* (2013.01); *G09G 2380/10* (2013.01)

(56) References Cited

U.S. PATENT DOCUMENTS

| | | | |
|---|---|---|---|
| 9,437,163 B2* | 9/2016 | Marcu | G09G 3/20 |
| 2002/0024529 A1* | 2/2002 | Miller | G09G 5/10 |
| | | | 345/690 |
| 2003/0043480 A1* | 3/2003 | Burgner | B60R 1/12 |
| | | | 359/844 |
| 2006/0257586 A1* | 11/2006 | Umeya | C09K 19/02 |
| | | | 428/1.1 |
| 2007/0109447 A1* | 5/2007 | Yamashita | G06T 5/004 |
| | | | 348/602 |
| 2008/0002062 A1* | 1/2008 | Kim | G06T 5/009 |
| | | | 348/602 |
| 2011/0175925 A1* | 7/2011 | Kane | G01J 1/42 |
| | | | 345/589 |
| 2013/0201334 A1* | 8/2013 | C | G06K 9/00818 |
| | | | 348/148 |
| 2013/0229443 A1* | 9/2013 | Kuroki | G09G 3/20 |
| | | | 345/690 |
| 2014/0028545 A1* | 1/2014 | Tsai | G06F 3/005 |
| | | | 345/156 |
| 2014/0198984 A1* | 7/2014 | Chen | G06T 7/001 |
| | | | 382/167 |
| 2015/0287370 A1* | 10/2015 | Takanashi | G09G 3/3607 |
| | | | 345/690 |
| 2016/0139416 A1* | 5/2016 | Yamakawa | G02B 26/101 |
| | | | 359/634 |
| 2016/0288717 A1* | 10/2016 | Kameshima | B60R 1/00 |
| 2017/0140699 A1* | 5/2017 | Okohira | B60R 1/00 |
| 2017/0219825 A1* | 8/2017 | Benoit | G02B 27/0103 |

* cited by examiner

FIG. 5
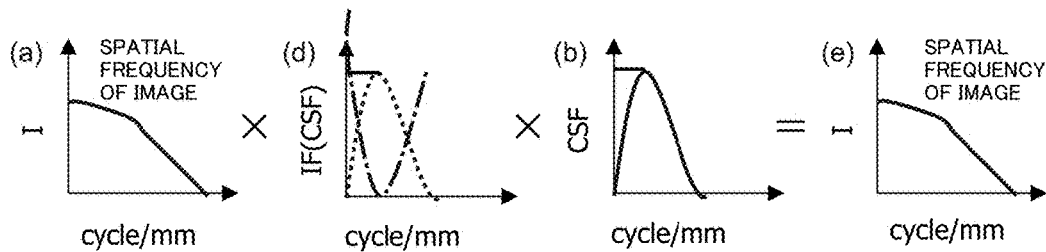
FIG. 6A            FIG. 6B
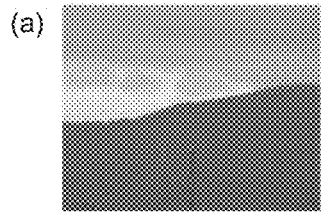    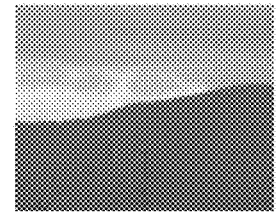
FIG. 7
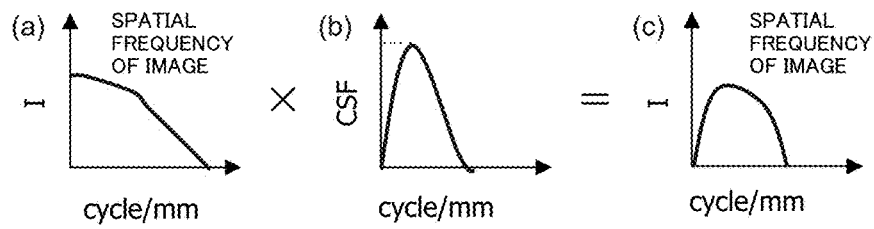
FIG. 8A            FIG. 8B
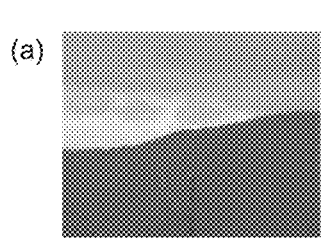    

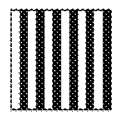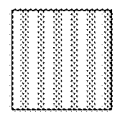
1cycle/mm
FIG. 13A          FIG. 13C
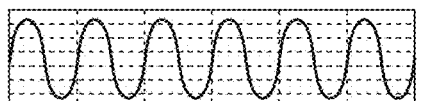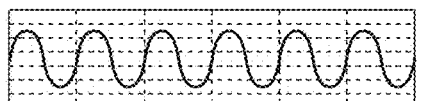
FIG. 13B          FIG. 13D
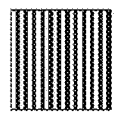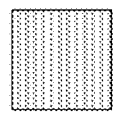
2cycle/mm
FIG. 14A          FIG. 14C
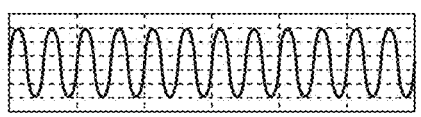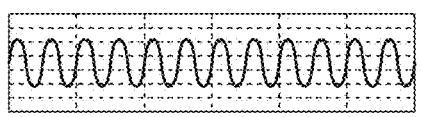
FIG. 14B          FIG. 14D
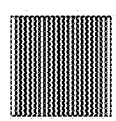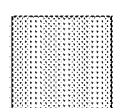
5cycle/mm
FIG. 15A          FIG. 15C
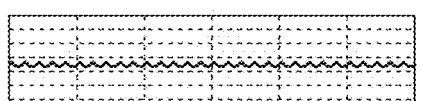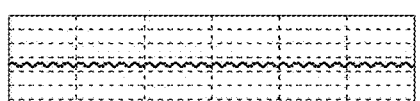
FIG. 15B          FIG. 15D

TRANSMISSIVE DISPLAY APPARATUS

CROSS-REFERENCE TO RELATED APPLICATIONS

The present application claims priority under 35 U.S.C. § 119 to Japanese Patent Application No. 2015-240408, filed on Dec. 9, 2015. The above application is hereby expressly incorporated by reference, in its entirety, into the present application.

BACKGROUND OF THE INVENTION

The present invention relates to display apparatuses, particularly to display apparatuses such as a transmissive display apparatus capable of displaying images with the optimal contrast condition by optimizing an optical system of an observation environment (i.e., ambient light, observation distance, and display brightness (or brightness of background ambient light and a reflected image), or brightness of a translucent image), thereby improving the visibility.

In recent years, transmissive display apparatuses have been proposed such as a mirror having an image display function or a mirror with a built-in monitor for displaying images taken by a camera and visual information on a rearview mirror, a side mirror or the like, and an information display apparatus for vehicles or a head-up display for projecting and displaying visual information on a windshield, a meter portion of a dashboard, a car navigation display apparatus or the like, and a part of such transmissive apparatuses has been already commercially used. The application of the technique of such transmissive display apparatuses not only to the vehicle technology field but also to fields of aircraft, military, medicine and computer game and other fields has been also proposed.

In relation to such transmissive display apparatuses, the visibility of a displayed image or displayed visual information deteriorates due to the lightness or brightness of a background or environment, or the visibility of a displayed image or displayed visual information superimposed on a landscape image deteriorates due to the changing landscape image. To cope with it, the technique of measuring or estimating the lightness or brightness of a background or environment and controlling the display brightness of a displayed image or displayed visual information in accordance with the lightness or brightness of the background or environment has been proposed. For transmissive display apparatuses, in order to further improve the visibility, controlling the display brightness of a displayed image or displayed visual information in accordance with not only the lightness or brightness of a background or environment but also the fineness thereof has been proposed (for instance, see JP 2013-174667 A).

JP 2013-174667 A discloses a display apparatus for vehicles comprising background brightness estimating means for estimating the brightness at a plurality of points in a front landscape to estimate a background brightness distribution, background spatial frequency estimating means for estimating spatial frequencies in a plurality of regions of the front landscape to estimate a background spatial frequency distribution, and control means for controlling the display brightness based on an estimation value of the background brightness distribution and an estimation value of the background spatial frequency distribution. The display apparatus for vehicles is defined to be able to control the display brightness in accordance with, in addition to the lightness (brightness) of a background at the place where the display is superimposed, the fineness (spatial frequency) of the background owing to the above configuration.

SUMMARY OF THE INVENTION

In the display apparatus for vehicles disclosed in JP 2013-174667 A, the visibility is improved by controlling the display brightness in accordance with, in addition to the lightness or brightness of a background, the fineness or spatial frequency of the background. Thus, for a transmissive display apparatus like the display apparatus for vehicles, "controlling the display brightness in accordance with the fineness of a background" is one possible measure to improve the visibility. In this case, however, display light is directly projected onto a windshield so that a projected image and/or projected visual information is superimposed on a front landscape image seen through the windshield as in the display apparatus for vehicles disclosed in JP 2013-174667 A. Accordingly, even when the display brightness of a display apparatus for vehicles is controlled in accordance with, in addition to the lightness or brightness of a background, the fineness or spatial frequency of the background, a projected image and/or projected visual information may be hard to see depending on the lightness or brightness of a front landscape image as the background image and/or the lightness or brightness of observation ambient light, so that the visibility should be poor. In particular, since such a display apparatus for vehicles itself has limited light emission intensity, when transmitted light passing through a windshield has a high lightness or brightness, even if the display brightness is controlled as in the display apparatus for vehicles disclosed in JP 2013-174667 A, a projected image and/or projected visual information may be hard to see and the visibility should be poor.

Meanwhile, in the case of a conventional display apparatus for vehicles which is called a mirror having an image display function such as a mirror with a built-in monitor, a conventional half mirror used as a display surface member has a low transmittance. Therefore, depending on the light emission intensity of a display apparatus for vehicles, the display brightness at a display surface of the display apparatus may decrease, leading to a narrower range of controllable display brightness. Consequently, a displayed image and/or displayed visual information is hard to see due to lower contrast, resulting in poor visibility.

In particular, in the case of a display apparatus for vehicles, the lightness and fineness of a background quickly and greatly change, and the observation time is also short. Therefore, with poor contrast, it is impossible to identify a displayed image and/or displayed visual information in a short period of time.

Aside from that, in transmissive display apparatuses like a conventional display apparatus for vehicles, while the lightness or brightness of a background image and the spatial frequency thereof are taken into account, the change in visibility depending on the observation distance of an observer is not considered, and therefore the visibility of a projected or displayed image and/or projected or displayed visual information is not appropriate for the observer.

Thus, for such transmissive display apparatuses like the display apparatus for vehicles, there is a need for further improvement in visibility.

In order to further improve the visibility, it is necessary to increase the display brightness and broaden the range of controllable display brightness. When a display surface member of a display apparatus for vehicles used as a rearview mirror is a half mirror, however, a conventional display surface member used as the half mirror has a limited transmittance, and therefore a display surface member having a high transmittance is required.

The present invention aims at solving the foregoing drawbacks of the prior art and, for an information display apparatus for vehicles, a head-up display or the like which superimposes displayed contents such as a projected and reflected image or a translucent display image and/or projected and reflected visual information or translucent display visual information onto a background image such as a landscape image and displays superimposed images, regardless of the lightness or brightness of the background image and ambient light as well as the observation distance of an observer, or for a mirror having an image display function, a mirror with a built-in monitor or the like which switches between the display of image and/or visual information and the mirror display, regardless of the light emission intensity or the display brightness of a display apparatus, the change in lightness or brightness of ambient light, and the observation distance of an observer, providing a display apparatus that enables spatial frequency characteristics of displayed contents to be spatial frequency characteristics of input contents such as input images and/or input visual information or spatial frequency characteristics preferable to the observer, that can prevent the contrast of displayed images and displayed contents from deteriorating, and that can improve the visibility of displayed images and displayed contents.

In short, as described above, the present invention aims at providing a display apparatus capable of displaying contents with the contrast optimized in accordance with ambient light, the display brightness of a display device (lightness or brightness of a background image and a reflected image or a translucent image) and the observation distance, thereby improving the visibility of the displayed contents.

In order to achieve the above-described object, a display apparatus of the present invention includes a display device including an imagewise light emitting unit configured to emit imagewise light for displaying an input image as a displayed image, and a display surface member that is disposed in a corresponding manner to the imagewise light emitting unit, that includes a display surface configured to reflect or transmit the input image resulting from emission of the imagewise light by the imagewise light emitting unit, to display the input image as the displayed image, and that is configured to transmit backside ambient light entering from a backside or reflect ambient light entering from a front side; an observation distance detecting section configured to detect an observation distance between the display surface and an observer who is observing the displayed image on the display surface of the display surface member of the display device; a display brightness acquiring section configured to acquire display brightness of the display device observed by the observer; an ambient light detecting section configured to detect the ambient light of an environment at the front side from which the observer observes the displayed image on the display surface; and an image processing unit configured to perform image processing to adjust input spatial frequency characteristics of the input image input to the imagewise light emitting unit based on the display brightness acquired by the display brightness acquiring section, the observation distance detected by the observation distance detecting section, and the ambient light detected by the ambient light detecting section such that display spatial frequency characteristics of the displayed image as visually recognized under conditions of the display brightness, the observation distance and the ambient light agree with target spatial frequency characteristics serving as a target.

Here, it is preferred that the imagewise light emitting unit is a projection unit emitting and projecting imagewise light of the input image onto the display surface of the display surface member of the display device, the display surface member is disposed in a corresponding manner to the projection unit, the display surface member causing projection light of the input image projected by the projection unit to be reflected and displayed on the display surface as the displayed image, and transmitting the backside ambient light entering from the backside, the display device is a projection type display device, and the display brightness acquiring section includes a backside ambient light detecting section configured to detect the backside ambient light entering from the backside of the display surface member and a reflection brightness acquiring section configured to acquire reflection brightness, at the display surface, of the projection light of the input image as emitted by the projection unit, the display brightness acquiring section obtaining the display brightness of the displayed image on the display surface using transmission brightness of the backside ambient light detected by the backside ambient light detecting section and the reflection brightness of the projection light of the input image.

Also, it is preferred that the display surface member is a half mirror or a wavelength selective film, the projection unit is at least one of a liquid crystal display, a reflective liquid crystal panel and a holographic optical element, and the display apparatus is one of a head-up display and an augmented reality device.

Also, it is preferred that the imagewise light emitting unit is a display unit emitting imagewise light for displaying the input image as the displayed image which is translucent on the display surface of the display surface member of the display device, the display surface member is disposed at the display unit, the display surface member transmitting the imagewise light that is emitted by the display unit and enters from the backside, to display the displayed image on the display surface, and also reflecting the ambient light entering from the front side, the display device is a transmissive display device, and the display brightness acquiring section acquires transmission brightness, at the display surface, of the imagewise light of the input image emitted by the display unit, as the display brightness.

Here, the display surface member is a half mirror or a wavelength selective film, the display unit is at least one of a liquid crystal display, a reflective liquid crystal panel and a holographic optical element, and the display apparatus is one of a mirror with image display function and a mirror with a built-in monitor.

Also, in the display apparatus, it is preferred that the display surface member includes a quarterwave plate and a circularly polarized light reflective layer as stacked in this order from a side at which the imagewise light emitting unit (a projection unit or a display unit) is disposed, the circularly polarized light reflective layer includes a cholesteric liquid crystalline layer in which a center wavelength of a selective reflection band is located within a visible light region, and at least one of the quarterwave plate and the circularly polarized light reflective layer is a half mirror including a layer formed of a liquid crystal composition containing a discotic liquid crystal compound.

Also, it is preferred that the target spatial frequency characteristics are the input spatial frequency characteristics, or the target spatial frequency characteristics are spatial frequency characteristics previously set or adjusted with respect to an initial spectrum of the input image.

Also, it is preferred that the image processing unit performs image processing on image data of the input image such that a difference between the display spatial frequency characteristics of the displayed image and the target spatial frequency characteristics is minimum, and outputs image data of the displayed image.

Also, it is preferred that the image processing unit optimizes contrast of the displayed image visually recognized such that change from contrast of an image having the target spatial frequency characteristics is minimum.

Also, it is preferred that the display spatial frequency characteristics of the displayed image are obtained by, after performing the image processing for the input spatial frequency characteristics of the input image, subjecting a visual sensitivity function determined based on the display brightness, the observation distance and the ambient light to convolution operation, and the image processing unit subjects an inverse function of the visual sensitivity function to convolution operation with respect to the input spatial frequency characteristics of the input image and performs correcting operation for correcting change between the target spatial frequency characteristics and the input spatial frequency characteristics, as the image processing.

Also, it is preferred that the image processing unit includes a memory configured to store the target spatial frequency characteristics; a calculating section configured to calculate a visual sensitivity function based on the display brightness, the observation distance and the ambient light; a target comparison section configured to compare the target spatial frequency characteristics stored in the memory and the input spatial frequency characteristics of the input image to obtain a rate of change therebetween; and an image processing section configured to subject an inverse function of the visual sensitivity function calculated by the calculating section to convolution operation with respect to the input spatial frequency characteristics of the input image, integrate the rate of change obtained based on a comparison result between the target spatial frequency characteristics and the input spatial frequency characteristics compared by the target comparison section to obtain the display spatial frequency characteristics of the displayed image, and perform the image processing on image data of the input image such that the display spatial frequency characteristics agree with the target spatial frequency characteristics.

Also, it is preferred that the memory further stores a target visual sensitivity function corresponding to the target spatial frequency characteristics and serving as a target or a target luminous efficiency curve represented as the target visual sensitivity function, and the image processing section performs the image processing on the image data of the input image at preset time intervals or at a time when a peak sensitivity of a luminous efficiency curve representing the visual sensitivity function calculated by the calculating section is shifted from a peak sensitivity of the target luminous efficiency curve by a certain percentage.

Also, it is preferred that the display brightness acquiring section, the observation distance detecting section and the ambient light detecting section respectively detect the display brightness, the observation distance and the ambient light and output the detected display brightness, observation distance and ambient light to the calculating section at preset time intervals, the calculating section calculates the visual sensitivity function at the preset time intervals based on the display brightness, the observation distance and the ambient light respectively output from the display brightness acquiring section, the observation distance detecting section and the ambient light detecting section, and the image processing section subjects an inverse function of the calculated visual sensitivity function to convolution operation, integrates the rate of change to obtain the display spatial frequency characteristics of the displayed image, and performs the image processing such that the displayed image has the obtained display spatial frequency characteristics, at the preset time intervals.

Also, it is preferred that the memory further stores a target visual sensitivity function corresponding to the target spatial frequency characteristics and serving as a target or a target luminous efficiency curve represented as the target visual sensitivity function, the display brightness acquiring section, the observation distance detecting section and the ambient light detecting section respectively detect the display brightness, the observation distance and the ambient light and output the detected display brightness, observation distance and ambient light to the calculating section at second preset time intervals, the calculating section calculates the visual sensitivity function at the second preset time intervals based on the display brightness, the observation distance and the ambient light respectively output from the display brightness acquiring section, the observation distance detecting section and the ambient light detecting section, and the image processing section performs the image processing on the image data of the input image at a time when a peak sensitivity of a luminous efficiency curve representing the visual sensitivity function output from the calculating section at the second preset time intervals is shifted from a peak sensitivity of the target luminous efficiency curve by a certain percentage.

Also, it is preferred that the visual sensitivity function is calculated using a product f×S(u) of a luminosity function S(u) represented by Formula (1) and a correction coefficient f represented by Formula (2):

$$S(u) = \frac{5200 e^{-0.0016 u^2 (1 + 100/L)^{0.08}}}{\sqrt{\left(1 + \frac{144}{X_o^2} + 0.64 u^2\right)\left(\frac{63}{L^{0.83}} + \frac{1}{1 - e^{-0.02 u^2}}\right)}} \quad (1)$$

$$f = e - \frac{\ln^2\left(\frac{L_s}{L}\left(1 + \frac{144}{X_o^2}\right)^{0.25}\right) - \ln^2\left(\left(1 + \frac{144}{X_o^2}\right)^{0.25}\right)}{2 \ln^2(32)} \quad (2)$$

where u is a spatial frequency (cycle/deg); L is the display brightness (cd/m$^2$); Ls is brightness (cd/m$^2$) of ambient light; and $X_o$ is a viewing angle (deg) of the display surface of the display unit with the observation distance.

Also, it is preferred that the display apparatus of the present invention further includes at least one of a characteristics adjusting section, a characteristics setting section and a characteristics inputting section, the characteristics adjusting section being used to previously determine the target spatial frequency characteristics by previously adjusting brightness of the displayed image observed by the observer, while observing the displayed image which is displayed on the display surface of the display surface member by the display unit in accordance with the display brightness, the observation distance and the ambient light, in order to store the target spatial frequency characteristics in the memory, the characteristics setting section being used by the observer to previously set the target spatial frequency characteristics, and the characteristics inputting section being used by the observer to previously input the target spatial frequency characteristics set by the observer.

Also, it is preferred that the image processing unit adjusts the input spatial frequency characteristics of the input image such that a function or graph indicative of a relationship between a spectral intensity and a spatial frequency of the displayed image, that is, of the display spatial frequency characteristics of the displayed image agrees with a function or graph indicative of a target relationship between a spectral intensity and a spatial frequency, that is, of the target spatial frequency characteristics.

Also, it is preferred that the target comparison section calculates, as the rate of change, a ratio between an intensity of an output image serving as a target and an intensity of the input image for each spatial frequency.

Also, it is preferred that the image processing section subjects the image data of the input image to image processing involving multiplying the input spatial frequency characteristics of the input image by the inverse function of the visual sensitivity function in a spatial frequency space, thereby generating image data of an output image.

As described above, according to the present invention, in an information display apparatus for vehicles, a head-up display or the like which superimposes displayed contents such as a projected and reflected image or a translucent display image and/or projected and reflected visual information or translucent display visual information onto a background image such as a landscape image and displays superimposed images, regardless of the lightness or brightness of the background image and ambient light as well as the observation distance of an observer, or in a mirror having an image display function, a mirror with a built-in monitor or the like which switches between the display of image and/or visual information and the mirror display, regardless of the light emission intensity of a display apparatus, the change in lightness or brightness of ambient light, and the observation distance of an observer, it is possible to enable spatial frequency characteristics of displayed contents to be spatial frequency characteristics of input contents such as input images and/or input visual information or spatial frequency characteristics preferable to the observer, prevent the contrast of displayed contents from deteriorating, and improve the visibility of displayed contents.

In short, the present invention can display contents with the contrast optimized in accordance with ambient light, the lightness or brightness of a background image or the light emission intensity of a display device, and the observation distance, thereby improving the visibility of the displayed contents.

BRIEF DESCRIPTION OF THE DRAWINGS

FIG. 5 is an explanatory view illustrating the processing for converting spatial frequency characteristics of an input image into target spatial frequency characteristics, which is performed in an image processing section of the image processing unit shown in FIGS. 2 and 3.

FIG. 6A is a photograph as a substitute of a drawing of an input image with spatial frequency characteristics (a) shown in FIG. 5; and FIG. 6B is a photograph as a substitute of a drawing of a displayed image with spatial frequency characteristics (e) shown in FIG. 5.

FIG. 7 is an explanatory view illustrating the deterioration of spatial frequency characteristics of an input image into spatial frequency characteristics of a displayed image due to an optical system of an observation environment.

FIG. 8A is a photograph as a substitute of a drawing of an input image with spatial frequency characteristics (a) shown in FIG. 7; and FIG. 8B is a photograph as a substitute of a drawing of a blurred displayed image with poor spatial frequency characteristics (c) shown in FIG. 7.

Figure 12:
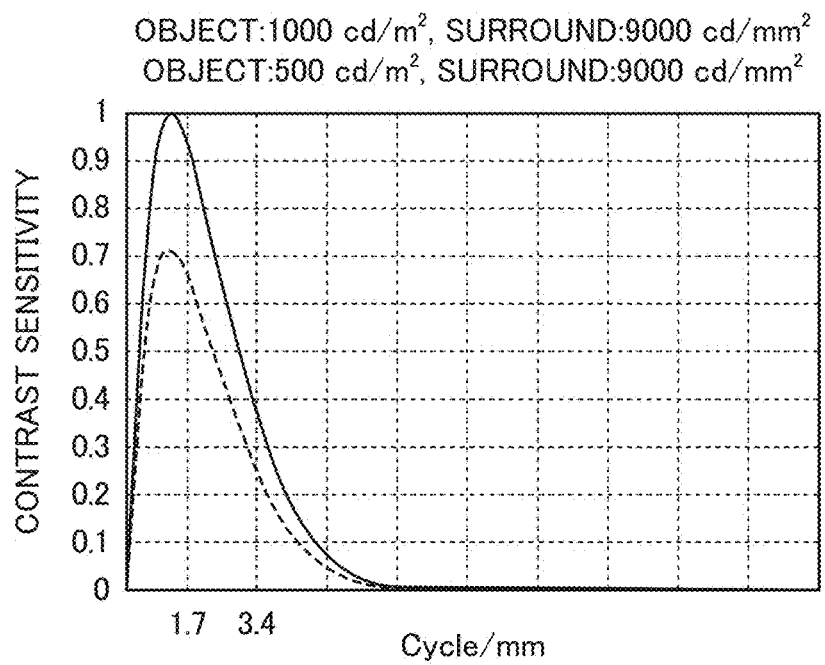
FIG. 12 is a graph showing the relationship between the contrast change dependent on ambient light and the luminous efficiency with two display brightnesses in the invention.

A pair of FIGS. 13A and 13B and a pair of FIGS. 13C and 13D are each a pair of an explanatory view and a graph for showing the change in contrast at the time of inputting square waves with high and low display brightnesses shown in FIG. 12, with a spatial frequency of 1 cycle/mm.

A pair of FIGS. 14A and 14B and a pair of FIGS. 14C and 14D are each a pair of an explanatory view and a graph for showing the change in contrast at the time of inputting square waves with high and low display brightnesses shown in FIG. 12, with a spatial frequency of 2 cycles/mm.

A pair of FIGS. 15A and 15B and a pair of FIGS. 15C and 15D are each a pair of an explanatory view and a graph for showing the change in contrast at the time of inputting square waves with high and low display brightnesses shown in FIG. 12, with a spatial frequency of 5 cycles/mm.

DETAILED DESCRIPTION OF THE INVENTION

A display apparatus according to the invention is described in detail below referring to preferred embodiments illustrated in the accompanying drawings.

The present invention provides a display apparatus, that is, a transmissive display apparatus capable of acquiring information on an environment (optical observation environment) of an observer to optimize images and/or contents, e.g., optimize display conditions such as display brightness so that a displayed image and/or displayed content is optimized or adjusted to have high contrast favorable to the observer such as a vehicle driver, a pilot of an aircraft, a health care provider or a player of a computer game. The term "environment" herein refers to the observation distance, ambient light (lightness or brightness), and display light (lightness or brightness) of a display device, e.g., background ambient light (lightness or brightness) or light emission (lightness or brightness) of a display.

In the display apparatus of the invention, when an observer is observing a displayed image and/or displayed content on a display surface of a display surface member, the visual sensitivity changes depending on the display brightness of a display device (the brightness of background ambient light and the reflection brightness of projected light, or the transmission brightness of transmitted light), ambient light and the observation distance. In particular, assuming the use for vehicles, the ambient light and the display brightness constantly change, and therefore the optimization needs to be done at predetermined timing in order to ensure the visibility. Thus, an optical system of observation environment (ambient light, observation distance, display brightness) needs to be optimized.

In the present invention, such optimization makes it possible to display images and/or contents under the optimal contrast conditions, thereby improving the visibility.

The present invention is applicable to, for example, fields of display apparatuses for vehicles such as a smart mirror and augmented reality (AR) devices such as a head-up display (HUD) and a head mounted display (HMD), and can be used as a transmissive display apparatus in such fields.

Figure 1:
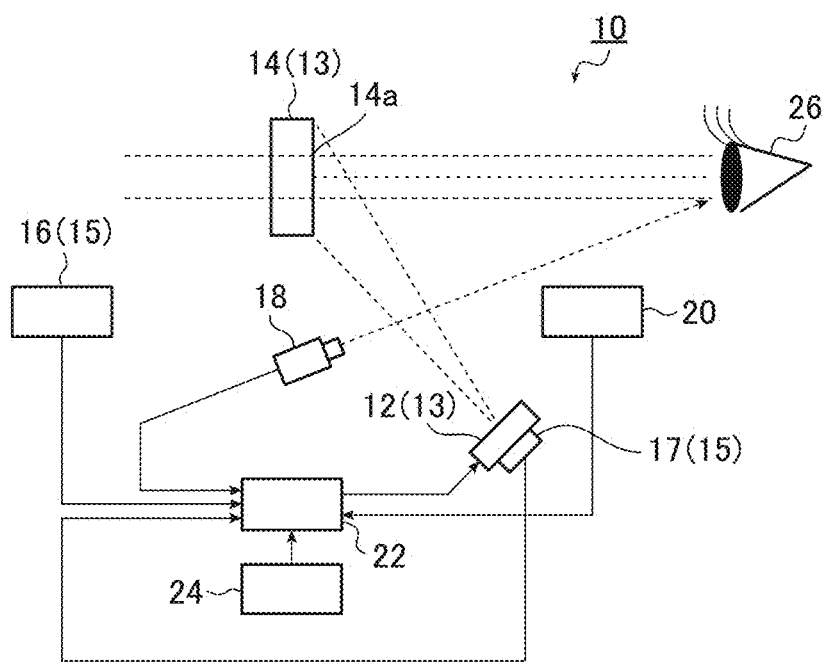
FIG. 1 is a configuration diagram schematically showing an example of a transmissive display apparatus according to a first embodiment of the present invention.
Figure 2:
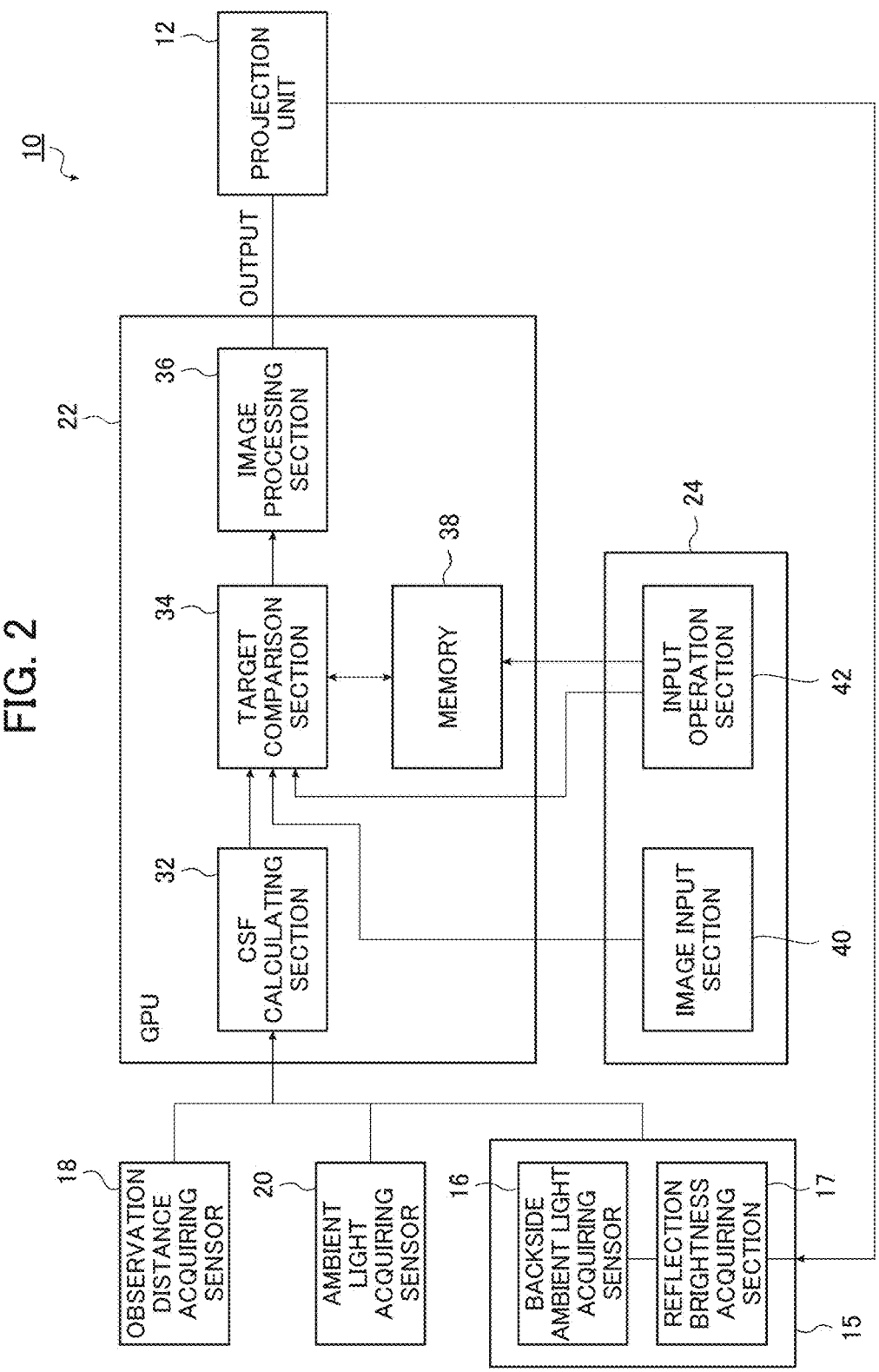
FIG. 2 is a block diagram schematically showing an example of the configuration of an image processing unit of the transmissive display apparatus shown in FIG. 1.
Figure 3:
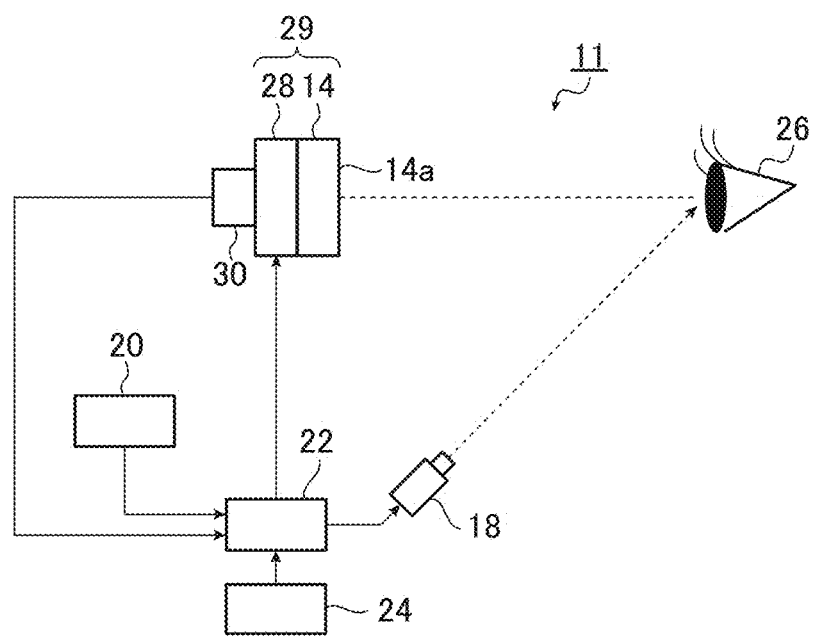
FIG. 3 is a configuration diagram schematically showing an example of a transmissive display apparatus according to a second embodiment of the present invention.
Figure 4:
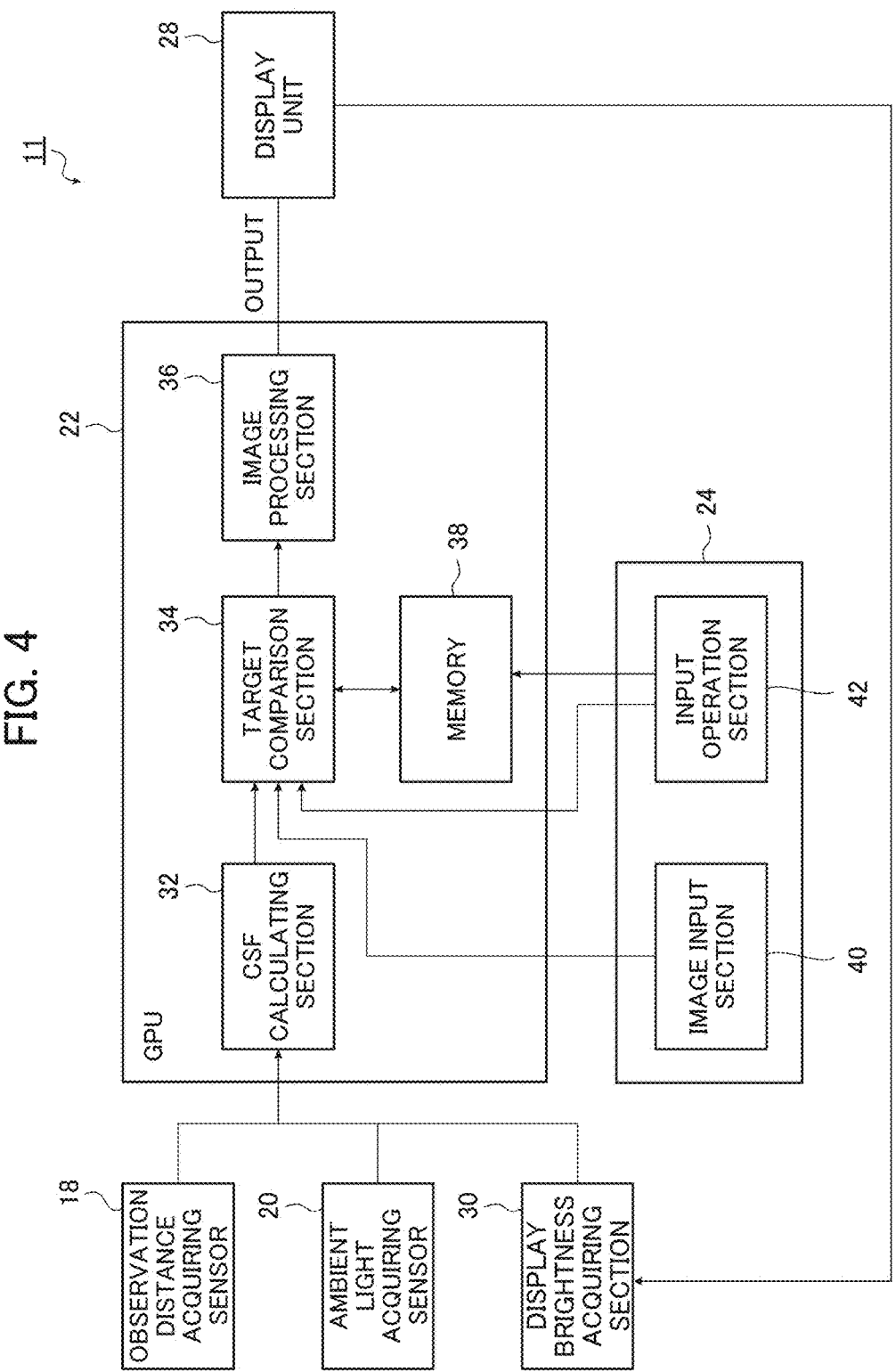
FIG. 4 is a block diagram schematically showing an example of the configuration of an image processing unit of the transmissive display apparatus shown in FIG. 2.

FIG. 1 is a configuration diagram schematically showing an example of a transmissive display apparatus according to a first embodiment of the present invention. FIG. 2 is a block diagram schematically showing an example of the internal configuration of the transmissive display apparatus shown in FIG. 1. FIG. 3 is a configuration diagram schematically showing an example of a transmissive display apparatus according to a second embodiment of the present invention. FIG. 4 is a block diagram schematically showing an example of the internal configuration of the transmissive display apparatus shown in FIG. 3.

A transmissive display apparatus 10 according to the first embodiment as shown in FIG. 1 and a transmissive display apparatus 11 according to the second embodiment as shown in FIG. 3 have the same configuration except for the type of displayed image and display brightness. To be more specific, the transmissive display apparatus 10 generates projected (or reflected) images as displayed images and acquires the brightness of backside ambient light and the reflection brightness as the display brightness, while the transmissive display apparatus 11 generates translucent images as displayed images and acquires the transmission brightness as the display brightness. First, the transmissive display apparatus 10 according to the first embodiment shown in FIG. 1 is described, and then the transmissive display apparatus 11 according to the second embodiment shown in FIG. 3 is described with focus on different points.

As shown in FIGS. 1 and 2, the transmissive display apparatus 10 in this embodiment includes a projection unit 12, a display surface member 14 having a display surface 14a, a display brightness acquiring section 15 having a backside ambient light acquiring sensor 16 and a reflection brightness acquiring section 17, an observation distance acquiring sensor 18, an ambient light acquiring sensor 20, an image processing unit 22, and an input unit 24. The projection unit 12 and the display surface member 14 constitute a display device 13 of the invention. The display device 13 is a reflection type display device that reflects and displays images (displayed images) to be observed by an observer 26.

Examples of the transmissive display apparatus 10 in this embodiment include display apparatuses for vehicles such as a smart mirror, augmented reality (AR) devices such as a head-up display (HUD), and display apparatuses for vehicles using such devices as display apparatuses for navigation systems such as a car navigation system.

The projection unit 12 is one constituent element of the display device 13 of the invention and is an imagewise light emitting unit that is disposed at a position corresponding to the display surface 14a of the display surface member 14, for instance, in the case of a display apparatus for vehicles, disposed at a position corresponding to the display surface 14a inside a vehicle, and that emits imagewise light to display an input image as a displayed image.

The projection unit 12 is disposed at a position corresponding to, but away from, the display surface member 14 and is a projection device for projecting an input image on the display surface 14a of the display surface member 14, more specifically, for irradiating the display surface 14a with projection light of the input image that emits imagewise light and causing the light to reflect off the display surface 14a to thereby display the input image as a displayed image. Any type of device may be used as the projection device as long as it can project an input image. Although a cathode ray tube (CRT) may be acceptable, a small size display is preferred. Such a small size display is preferably composed of, for instance, a liquid crystal display (LCD), a reflective liquid crystal panel (liquid crystal on silicon (LCOS)), a holographic optical element and the like.

The display surface member 14 is one constituent element of the display device 13 of the invention. The display surface member 14 is provided in a corresponding manner to the projection unit 12 that is the imagewise light emitting unit, and causes projection light of an input image, which has been formed as a result of emission and projection of imagewise light onto the display surface 14a by the projection unit 12, to be reflected and displayed as a displayed image, as well as transmitting backside ambient light entering from the backside. Any member may be used for the display surface member 14 as long as it can reflect projection light from the projection unit 12 to such an extent that the observer 26 can visually recognize an input image projected on the display surface 14a as a displayed image, is so transparent that the observer 26 can observe the background of the display surface member 14, i.e., the backside or reverse side of the display surface member 14, for instance, in the case of an HUD disposed in a vehicle such as an automobile, a landscape outside the vehicle, and can transmit reflection light from the background.

Any member may be used for the display surface member 14 as long as it can reflect, on the display surface 14a, part of light (projection light of an input image and ambient light) entering from the front side and transmit part of light entering from the backside. Exemplary materials for the display surface member 14 include a half mirror, a wavelength selective film, a transparent film, transparent resin materials such as acrylic resins, and a transparent glass. Of these, a half mirror and a wavelength selective film are preferred.

Such a half mirror or wavelength selective film is preferably attached on a transparent resin material, a transparent glass or the like for use. For instance, it is preferable that a half mirror or wavelength selective film be attached on and supported by a windshield (not shown) in the case of a display apparatus for vehicles or the like, or a canopy (not shown) made of transparent resin or glass in the case of a display apparatus for aircrafts or the like; however, a half mirror or wavelength selective film may be attached on transparent glass or a board made of resin (neither shown) as used for a meter section.

For such a half mirror or wavelength selective film used as the display surface member 14, for example, a half mirror for displaying a projected image as disclosed in WO 2015/050202 A1, WO 2015/050203 A1 or WO 2015/050204 A1 filed by the applicant of the present application, such as a half mirror for displaying a projected image including one or more layers formed by immobilizing a cholesteric liquid crystalline phase as a selective reflection layer, or a half mirror for displaying a projected image including three or more layers formed by immobilizing a cholesteric liquid crystalline phase and having selective reflectivity associated with red (R) light, green (G) light and blue (B) light, may be employed.

For the display surface member 14, a half mirror comprising a laminate portion including a quarterwave plate and a circularly polarized light reflective layer, for use in a mirror with image display function described in Japanese Patent Application No. 2015-137026 filed by the applicant of the present application, may also be employed. The half mirror includes the quarterwave plate and the circularly polarized light reflective layer as stacked in this order from the projection unit 12 side, the circularly polarized light reflective layer including a cholesteric liquid crystalline layer in which the center wavelength of a selective reflection band is located within a visible light region, at least one of the quarterwave plate and the circularly polarized light reflective layer including a layer formed of a liquid crystal composition containing a discotic liquid crystal compound. The half mirror is described below in detail.

The display brightness acquiring section 15 is configured to acquire the display brightness of the display device 13 observed by the observer 26, i.e., the display brightness of a displayed image on the display device 13.

The display brightness acquiring section 15 includes the backside ambient light acquiring sensor 16 detecting backside ambient light that enters from the backside of the display surface member 14 and the reflection brightness acquiring section 17 acquiring the reflection brightness (average brightness) at the display surface 14a of the display surface member 14. The display brightness acquiring section 15 obtains the display brightness of a displayed image on the display surface 14a of the display device 13 using the transmission brightness of backside ambient light (light of the outside, traffic lights, sky and the like) detected by the backside ambient light acquiring sensor 16 and the reflection brightness of projection light of an input image (controllable brightness of projected image or content) acquired by the reflection brightness acquiring section 17. For instance, the display brightness acquiring section 15 may add up a transmission brightness value of backside ambient light and a reflection brightness value at the display surface 14a and take the result as the display brightness.

The display brightness of the display device 13 refers to the brightness attributable to a displayed image on the display surface 14a of the display surface member 14 of the display device 13 that the observer 26 sees with his/her eyes (26) when observing the displayed image. In the present invention, one factor influencing the observation of a displayed image by the observer 26, for instance, the visibility thereof is the brightness of light entering the eyes of the observer 26. Factors influencing the visibility of a displayed image, that is, the brightness of light entering the eyes of the observer 26 comprises, in addition to the display brightness of a displayed image described above, the brightness of an observation environment, for instance, in the case of a display apparatus for vehicles, the brightness of ambient light in an in-vehicle environment; however, the brightness of an observation environment is not attributed to a displayed image and is therefore discussed separately in the present invention.

The backside ambient light acquiring sensor 16 is configured to detect or measure backside ambient light entering from the backside or reverse side of the display surface member 14 to obtain, for instance, the lightness or brightness of the light. The backside ambient light acquiring sensor 16 constitutes a backside ambient light detecting section of the invention. The backside ambient light acquiring sensor 16 for example detects or measures the lightness or brightness of reflection light of a background that is reflected by the background of the display surface member 14 and enters the display surface member 14, to obtain the lightness or brightness. In the case of a display apparatus for vehicles for instance, the backside ambient light acquiring sensor 16 acquires the brightness of an environment outside a vehicle, that is, the average brightness of the view outside.

Any device may be used for the backside ambient light acquiring sensor 16 as long as it can detect or measure the lightness or brightness of background ambient light of the display surface member 14 to obtain the lightness or brightness, and for example, a brightness sensor or the like may be used. For the backside ambient light detecting section, instead of directly detecting the brightness of backside ambient light with a brightness sensor, a camera may be used to acquire image data of a shot image of the backside so that the brightness of backside ambient light can be calculated using the image data.

The reflection brightness acquiring section 17 is configured to acquire the brightness (reflection brightness) of a displayed image formed as a result of reflection of projection light of an input image at the display surface 14a, the projection light having been caused by imagewise light emission by the projection unit 12. The brightness of light (image light) caused by imagewise light emission from the projection unit 12, i.e., the light emission brightness of projection light can be calculated from image data of an input image input to the projection unit 12 and is therefore known, and the reflectance of the display surface member 14 such as a half mirror or a wavelength selective film is also known. Accordingly, the reflection brightness acquiring section 17 can acquire the reflection brightness at the display surface 14a from the light emission brightness of projection light, as obtained based on image data of an input image sent from the projection unit 12, and the reflectance of the display surface member 14.

While the reflection brightness acquiring section 17 obtains the reflection brightness of a reflected image from image data of an input image and the reflectance of the display surface member 14, instead, a reflection brightness acquiring sensor such as a brightness sensor may be disposed on the front side (visually recognizable side) of the display surface 14a of the display surface member 14 at a position corresponding to and opposite from the projection unit 12 to directly measure and detect the reflection brightness, or alternatively, a camera may be used instead of the reflection brightness acquiring sensor, and in this case, the brightness of ambient light may be calculated using shot image data of a reflected image shot with the camera.

While the display brightness acquiring section 15 obtains the display brightness of the display device 13 using the transmission brightness of backside ambient light acquired by the backside ambient light acquiring sensor 16 and the reflection brightness of projection light acquired by the reflection brightness acquiring section 17, a display brightness acquiring sensor such as a brightness sensor may be disposed on the front side (visually recognizable side) of the display surface 14a of the display surface member 14 to directly measure and detect the display brightness comprising the reflection brightness of projection light and the transmission brightness of backside ambient light, or alternatively, a camera may be used instead of the display brightness acquiring sensor, and in this case, the display brightness may be calculated using shot image data of a displayed image shot with the camera.

The observation distance acquiring sensor 18 is configured to detect or measure the observation distance, e.g., line-of-sight distance, of the observer 26 who is observing a displayed image on the display surface 14a of the display surface member 14, to acquire the observation distance. The observation distance acquiring sensor 18 may also be referred to as a line-of-sight distance acquiring sensor and constitutes an observation distance detecting section of the invention. The observation distance acquiring sensor 18 for example detects or measures the observation distance, e.g., line-of-sight distance, of the observer 26 who is observing a displayed image on the display surface member 14, to acquire the observation distance.

Any device may be used for the observation distance acquiring sensor 18 as long as it can detect or measure the observation distance, e.g., line-of-sight distance, of the observer 26 to obtain the observation distance, and for example, a distance sensor or the like may be used. For the observation distance detecting section, instead of directly detecting the observation distance or the line-of-sight distance of the observer 26 with a distance sensor, the observation distance or the line-of-sight distance may be estimated by locating the position of the eyes of the observer 26 with a camera using infrared rays, or may be estimated based on a preset seat position.

The ambient light acquiring sensor 20 is configured to detect or measure ambient light of an environment on the front side from which a displayed image on the display surface 14a of the display surface member 14 is observed, that is, front ambient light, to obtain, for instance, the lightness or brightness of the front ambient light. The ambient light acquiring sensor 20 constitutes an ambient light detecting section of the invention. For example, the ambient light acquiring sensor 20 detects or measures the lightness or brightness of an environment on the side from which a displayed image projected from the projection unit 12 and reflected and displayed on the display surface 14a of the display surface member 14 is observed, to obtain the lightness or brightness.

Any device may be used for the ambient light acquiring sensor 20 as long as it can detect or measure the lightness or brightness of ambient light of an observation environment around a displayed image to obtain the lightness or brightness, and for example, a brightness sensor or the like may be used. For the ambient light detecting section, instead of directly detecting the brightness of ambient light with a brightness sensor, a camera may be used so that the brightness of ambient light is calculated from image data of a shot image of an observation environment shot with the camera.

The image processing unit 22 is a graphics processing unit (GPU) that performs image processing for adjusting input spatial frequency characteristics of an input image input to the projection unit 12 based on the display brightness of a displayed image on the display device 13 as detected by the display brightness acquiring section 15, the observation distance detected by the observation distance acquiring sensor 18, and the ambient light detected by the ambient light acquiring sensor 20, i.e., the measured and acquired lightness or brightness (hereinafter collectively referred to as brightness) of front ambient light, so that display spatial frequency characteristics of the displayed image on the displayed surface 14 as visually recognized under the conditions of the display brightness, the observation distance and the ambient light (i.e., the brightness thereof), that is, a function or a graph (characteristics curve) indicative of the relationship between a spectral intensity I and a spatial frequency (cycle/mm) of the displayed image agrees with target spatial frequency characteristics (function or graph).

The input unit 24 is used to input an input image (image data) to the image processing unit 22 and is also for use in manipulation for inputting or adjusting target spatial frequency characteristics representing a target spectral intensity (I) with respect to a spatial frequency as needed.

Instead of directly using the display brightness of a displayed image on the display device 13 detected by the display brightness acquiring section 15, the image processing unit 22 may use backside ambient light detected by the backside ambient light acquiring sensor 16, i.e., the brightness (or lightness) of backside ambient light measured and acquired thereby, and the reflection brightness (or lightness) of projection light detected by the reflection brightness acquiring section 17, or alternatively may obtain the display brightness from backside ambient light, i.e., the brightness thereof, and the reflection brightness of projection light and use the obtained display brightness.

The image processing unit 22 preferably performs image processing on an input image or image data thereof so that display spatial frequency characteristics of a displayed image agree with target spatial frequency characteristics or that the difference therebetween is minimized, to generate a processed image, i.e., image data of the displayed image, and outputs the processed image (image data of the displayed image) to the projection unit 12. In addition, the image processing unit 22 preferably optimizes the contrast of a displayed image visually recognized so that the change from the contrast of an image having target spatial frequency characteristics is minimum.

The target spatial frequency characteristics are preferably input spatial frequency characteristics of an input image as shown in a graph (e) of FIG. 5.

The display spatial frequency characteristics of a displayed image are preferably obtained by, after performing image processing for input spatial frequency characteristics of an input image, subjecting a visual sensitivity function determined based on the display brightness (or backside ambient light (brightness) and the reflection brightness of a reflected image, or the transmission brightness of a translucent image), the observation distance, and ambient light (brightness) to convolution operation.

In this case, in the image processing, the image processing unit 22 preferably subjects an inverse function of the visual sensitivity function to convolution operation with the spatial frequency characteristics of the input image and performs the operation for correcting the change or difference between the target spatial frequency characteristics and the input spatial frequency characteristics, on image data of the input image.

As shown in FIG. 2, the image processing unit (GPU) 22 includes a calculating section 32 calculating a visual sensitivity function (contrast sensitivity function (CSF)), a target comparison section 34, an image processing section 36 and a memory 38.

The calculating section 32 for CSF is configured to receive the observation distance output from the observation distance acquiring sensor 18, the display brightness output from the display brightness acquiring section 15 (or the brightness of backside ambient light output from the backside ambient light acquiring sensor 16, and the reflection brightness of projection light output from the reflection brightness acquiring section 17), and the brightness of ambient light output from the ambient light acquiring sensor 20, and calculate a visual sensitivity function (CSF) based on the observation distance, the display brightness (or the brightness of backside ambient light and the reflection brightness), and the brightness of ambient light as input. The calculating section 32 constitutes a calculating section of the invention. For instance, the calculating section 32 calculates such a visual sensitivity function CSF as shown in graphs (b) in FIGS. 5 and 7, that is, the luminous efficiency for each spacial frequency and sends the calculated visual sensitivity function CSF, that is, the calculated luminous efficiency for each spacial frequency to the target comparison section 34.

In the present invention, for the visual sensitivity function (CSF: contrast sensitivity function), it is preferable to use the product (f×S(u)) of a luminosity function (CSF: visual transfer function) S(u) represented by Formula (1) below and a correction coefficient f represented by Formula (2) below, that is, the luminosity function (CSF) S(u) corrected with the correction coefficient f.

Formula (2) below expresses the influence on the luminosity function S(u) as the correction coefficient f by which the luminosity function S(u) is multiplied, by modeling ambient light.

$$S(u) = \frac{5200 e^{-0.0016 u^2 (1+100/L)^{0.08}}}{\sqrt{\left(1 + \frac{144}{X_o^2} + 0.64 u^2\right)\left(\frac{63}{L^{0.83}} + \frac{1}{1 - e^{-0.02 u^2}}\right)}} \quad (1)$$

$$f = e - \frac{\ln^2\left(\frac{L_s}{L}\left(1 + \frac{144}{X_o^2}\right)^{0.25}\right) - \ln^2\left(\left(1 + \frac{144}{X_o^2}\right)^{0.25}\right)}{2\ln^2(32)} \quad (2)$$

In the formulae, u is a spatial frequency (cycle/deg); L is the display brightness (the brightness of backside ambient light and the reflection brightness of a reflected image, or the transmission brightness of a translucent image) (cd/m$^2$); Ls is the brightness (cd/m$^2$) of ambient light; and $X_0$ is the viewing angle (deg) of the display surface of the display unit 28 with a certain observation distance.

The luminosity function expressed by Formula (1) above is a luminosity function (contrast sensitivity function (CFS)) S(u) expressed by Formula (11) described in page 234 in the article "Formula for the contrast sensitivity of the human eye," Peter G. J. Barten, Image Quality and System Performance, edited by Yoichi Miyake, D. René Rasmussen, Proc. of SPIE-IS&T Electronic Imaging, SPIE Vol. 5294© 2004 SPIE and IS&T, 0277-786X/04/$15.00, P. 231-P. 238.

Formula (1) above is often used for a reflection system and is also suitably applicable to a transmission system, for instance, a display such as a display unit 28 to be described later. Formula (1) allows the observation distance to be considered and allows the difference in sensitivity occurring due to the average brightness of background ambient light and the reflection brightness of a reflected image or the transmission brightness of a translucent display image on a display to be considered.

The target comparison section 34 is configured to calculate input spatial frequency characteristics of an input image input from an image input section 40 of the input unit 24 using image data of the input image, read out target spatial frequency characteristics stored in the memory 38, and compare the calculated input spatial frequency characteristics with the read-out target spatial frequency characteristics to obtain the rate of change. The target comparison section 34 calculates, as the rate of change of input spatial frequency characteristics with respect to target spatial frequency characteristics, the ratio between the target spatial frequency characteristics and the input spatial frequency characteristics, i.e., the ratio between a target spatial frequency characteristics value, which is the intensity (I) of an output image serving as a target, and an input spatial frequency characteristics value, which is the intensity (I) of an input image, for each spatial frequency.

The target comparison section 34 sends the calculated rate of change, i.e., the intensity (I) ratio for each spatial frequency to the image processing section 36 along with the visual sensitivity function CSF, i.e., the luminous efficiency for each spatial frequency received from the calculating section 32.

The image processing section 36 is configured to subject an inverse function of a visual sensitivity function CSF calculated by the calculating section 32 to convolution operation with respect to input spatial frequency characteristics of an input image, integrate the rate of change obtained based on a comparison result between target spatial frequency characteristics and the input spatial frequency characteristics compared by the target comparison section 34 to obtain display spatial frequency characteristics of a displayed image, and perform image processing on image data of the input image so that the display spatial frequency characteristics agree with the target spatial frequency characteristics.

For instance, as shown in FIG. 5, with the input spatial frequency characteristics of an input image being one represented by the graph (a) and the display spatial frequency characteristics of a displayed image which is an output image to be visually recognized being one represented by the graph (e), when the spatial frequency does not deteriorate and is ideal, both the spatial frequency characteristics, i.e., both the graphs (a) and (e) are conform with each other. The output image (e) shown in FIG. 6B exhibits no deterioration in spatial frequency compared to the input image (a) shown in FIG. 6A, so that an observer can visually recognize the output image (e) as the image identical to the input image (a) with no contrast deterioration.

In the real world, however, when the environment around the observer who is visually recognizing images, including external factors such as, for instance, the observation distance, the display brightness (the brightness of backside ambient light and the reflection brightness of a reflected image, or the transmission brightness of a translucent image) and ambient light (brightness), changes, the input image (a) shown in FIG. 8A identical to the input image (a) shown in FIG. 6A deteriorates in spatial frequency and hence in contrast, which results in a blurred output image with poor image quality and visibility as shown in FIG. 8B. Thus the deterioration in visibility occurs due to the change in spatial frequency characteristics.

It can be said that, in a spatial frequency space, the change in spatial frequency characteristics that leads to the deterioration in visibility is caused by convolution of the CSF shown in the graph (b) of FIG. 7, which CSF is attributable to the above external factors, with respect to the input spatial frequency characteristics of the input image shown in the graph (a) of FIG. 7.

As a result, the input spatial frequency characteristics of the input image shown in the graph (a) of FIG. 7 deteriorate and change to the display spatial frequency characteristics of the output image (displayed image) shown in the graph (c) of FIG. 7. Consequently, the displayed image on the display surface 14a of the display surface member 14 has poor visibility.

To cope with it, in the present invention, the image processing section 36 of the image processing unit 22 performs image processing for canceling the deterioration in image quality, that is, the change in spatial frequency characteristics caused due to the external factors in order to minimize the deterioration in visibility.

For example, with a CSF determined by the external factors being one represented by the graph (b) of FIG. 5, the image processing section 36 subjects image data of an input image to image processing involving multiplying the input spatial frequency characteristics (assigned by Ii) of the input image represented by the graph (a) of FIG. 5 by the inverse function IF(CSF) of the CSF represented by the graph (d) of FIG. 5, thereby generating image data of an output image.

Thus, the display spatial frequency characteristics (assigned by Io) of the output image represented by the graph (e) of FIG. 5 can be obtained by multiplication of the input spatial frequency characteristics (Ii) of the input image represented by the graph (a) of FIG. 5, the inverse function (IF(CSF)) of the CSF represented by the graph (d) of FIG. 5, and the CSF represented by the graph (b) of FIG. 5. In other words, the calculation of the display spatial frequency characteristics (Io) of the output image shown in FIG. 5 can be expressed by Formula (3).

$$Io = Ii \times IF(CSF) \times CSF \quad (3)$$

In the formula above, since the multiplication of the inverse function (IF(CSF)) of the CSF represented by the graph (d) of FIG. 5 by the CSF represented by the graph (b) of FIG. 5 is the identity transformation, the display spatial frequency characteristics (Io) of the output image represented by the graph (e) of FIG. 5 is to be identical to the input spatial frequency characteristics (Ii) of the input image represented by the graph (a) of FIG. 5, that is, Io=Ii.

Consequently, the output image (e) of FIG. 6B having the display spatial frequency characteristics (Io) represented by the graph (e) of FIG. 5 is to be the same as the input image (a) of FIG. 6A having the input spatial frequency characteristics (Ii) represented by the graph (a) of FIG. 5, and therefore the observer 26 can visually recognize the resulting image with no deterioration in spatial frequency characteristics and hence no deterioration in contrast compared to the input image (a) shown in FIG. 6A.

Thus, in the present invention, even when the spatial frequency (contrast) is deteriorated due to a CSF determined by the external factors, the image processing section 36 can obtain image data of an output image having display spatial frequency characteristics (Io) identical to input spatial frequency characteristics (Ii) by previously performing the processing involving multiplying the input spatial frequency characteristics (Ii) by an inverse function IF(CSF) of the CSF in a spatial frequency space as image processing on image data of an input image having the input spatial frequency characteristics (Ii).

In the example illustrated in FIG. 5, it can be said that when an output image having the display spatial frequency characteristics (Io) represented by the graph (e) is set as the target, since the display spatial frequency characteristics (Io) represented by the graph (e) is a reproduction of the input spatial frequency characteristics (Ii) represented by the graph (a), target spatial frequency characteristics to be achieved are the input spatial frequency characteristics (Ii) represented by the graph (a).

Figure 9A:
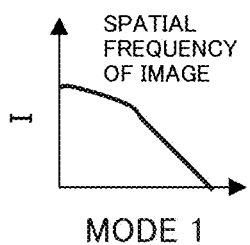
FIGS. 9A to 9C are graphs showing target spatial frequency characteristics used in the present invention.
Figure 9B:
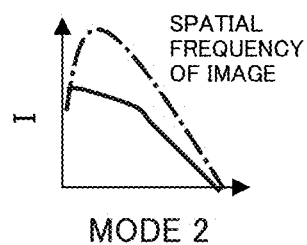
Figure 9C:
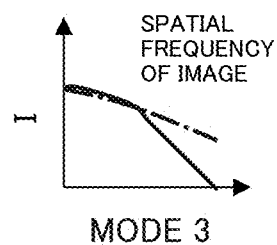

In the present invention, as described above, the target spatial frequency characteristics are preferably the same as the input spatial frequency characteristics (Ii) of an input image as shown in FIG. 5; however, the present invention is not limited thereto and, as shown in FIGS. 9A to 9C, the target spatial frequency characteristics may be spatial frequency characteristics previously set or adjusted with respect to the initial spectrum of an input image (spectral intensity—spatial frequency function), e.g., the input spatial frequency characteristics (Ii).

In the present invention, for instance, with input spatial frequency characteristics of an input image being represented by Ii, target spatial frequency characteristics that an output image should have being represented by It, a visual sensitivity function (contrast sensitivity function) determined by the external factors being represented by CSF, and conversion characteristics (conversion function) used in conversion processing performed in the image processing being represented by IP, Formulae (4) and (5) can be established using an analogy from Formula (3), as follows.

$$It = Ii \times IP \times CSF \quad (4)$$

$$IP = It \times Ii^{-1} \times CSF^{-1} \quad (5)$$

In Formula (5), it can be said that $Ii^{-1}$ is inverse characteristics of the input spatial frequency characteristics Ii, and hence $It \times Ii^{-1}$ is the product of the target spatial frequency characteristics It and the inverse characteristics of the input spatial frequency characteristics Ii, that is, the ratio between the target spatial frequency characteristics It and the input spatial frequency characteristics Ii (It/Ii), or the rate of change of the input spatial frequency characteristics Ii relative to the target spatial frequency characteristics It (It/Ii).

In addition, it can be said that $CSF^{-1}$ is an inverse function of the visual sensitivity function CSF, and therefore, $CSF^{-1}$ can be represented by IF(CSF) as above, that is, $CSF^{-1}$=IF(CSF).

Therefore, the conversion characteristics IP for the image processing as expressed by Formula (5) above can be expressed by Formula (6) below.

$$IP = (It/Ii) \times IF(CSF) \quad (6)$$

When the display spatial frequency characteristics (Io) of an output image is expressed by Formula (3) above, assuming Io=It=Ii, the conversion characteristics IP for the image processing are to be expressed by Formula (7) below based on Formula (6) above.

$$IP = IF(CSF) \quad (7)$$

While in the example described above, the input spatial frequency characteristics Ii is multiplied by the inverse function IF(CSF) of the visual sensitivity function CSF in the image processing in order to obtain the display spatial frequency characteristics (Io) of the output image identical or close to the target spatial frequency characteristics (It), when the original CSF is 0, division results in divergence and therefore, clipping is preferably applied with regarding the case where the square of the spectral intensity (I), i.e., $I^2$ of an image is 1 as the maximum limit. Thus, the absolute value ($I^2$) can be defined by the intensity.

It would be understood from above that the image processing section 36 subjects an inverse function IF(CSF) of a visual sensitivity function CSF calculated by the calculating section 32 to convolution operation with input spatial frequency characteristics (Ii) of an input image, integrates the rate of change (It/Ii) obtained based on a comparison result between target spatial frequency characteristics and the input spatial frequency characteristics compared by the target comparison section 34 to obtain display spatial frequency characteristics (Io) of a displayed image, and performs image processing on image data of the input image so that the display spatial frequency characteristics (Io) agree with the target spatial frequency characteristics (It).

The memory 38 is configured to store target spatial frequency characteristics. The memory 38 preferably stores therein, as the target spatial frequency characteristics, for instance, the input spatial frequency characteristics (Ii) shown in the graph (a) of FIG. 5 calculated by the target comparison section 34 or the target spatial frequency characteristics of modes 1, 2 and 3 shown in FIGS. 9A to 9C. The memory 38 is not limited to one storing target spatial frequency characteristics as above, and may be one storing the ratio between the target spatial frequency characteristics It and the input spatial frequency characteristics Ii or the rate of change (It/Ii) calculated by the target comparison section 34, or one storing a target visual sensitivity function corresponding to target spatial frequency characteristics and serving as the target, or a target luminous efficiency curve represented as a target visual sensitivity function.

The memory 38 is not necessarily disposed in the image processing unit 22 as illustrated in FIG. 2 but may be disposed outside the image processing unit 22, for example in the input unit 24.

The input unit 24 preferably includes the image input section 40 and an input operation section 42.

The image input section 40 is provided to input image data of an input image to the image processing unit (GPU) 22, namely, the target comparison section 34 thereof. Image data of an input image may be one taken by an imaging device such as a camera (not shown) or one previously stored in an external memory (not shown) or the memory 38.

The input operation section 42 may be configured to serve as a characteristics inputting section of the invention for inputting, as target spatial frequency characteristics (It), for instance, input spatial frequency characteristics (Ii) or the target spatial frequency characteristics of modes 1, 2 and 3 shown in FIGS. 9A to 9C to the memory 38 or the target comparison section 34 in advance or as needed. That is, the characteristics inputting section of the invention may be used by an observer to previously input target spatial frequency characteristics set by the observer. Furthermore, the input operation section 42 may be configured to serve as a characteristics setting section of the invention for previously setting the target spatial frequency characteristics of modes 1, 2 and 3 as above for the initial spectrum of an input image, e.g., input spatial frequency characteristics. That is, the characteristics setting section of the invention may be used by an observer to previously set target spatial frequency characteristics. Furthermore, the input operation unit 42 may be configured to serve as a characteristics adjusting section of the invention for adjusting previously-input or -set target spatial frequency characteristics. That is, the characteristics adjusting section of the invention may be used by an observer to previously determine target spatial frequency characteristics by, while observing a displayed image which is displayed on the display surface 14a of the display surface member 14 by the display unit 28, previously adjusting the brightness of the displayed image observed, in accordance with the display brightness, the observation distance and ambient light in order to store the target spatial frequency characteristics in the memory 38.

Thus the input operation section 42 preferably has at least one of functions of the characteristics inputting section, characteristics setting section and characteristics adjusting section of the invention.

Thus target spatial frequency characteristics representing target spectral intensity (I) with respect to a spatial frequency may be input or adjusted by an observer or a user, for instance, in the case of a display apparatus for vehicles, a driver, or may be previously prepared by a system.

In the transmissive display apparatus 10 of the invention, preferably, the memory 38 stores therein a target visual sensitivity function corresponding to target spatial frequency characteristics and serving as the target, or a target luminous efficiency curve represented as a target visual sensitivity function in advance, and the image processing section 36 performs image processing on image data of an input image at preset time intervals set as updating timing for image processing, e.g., at intervals of 1 s to 10 min or at the time when a peak sensitivity of a luminous efficiency curve (preferably, f×S(u)) representing a visual sensitivity function CSF calculated by the calculating section 32 is shifted from a peak sensitivity of the target luminous efficiency curve or a peak sensitivity of a previously-calculated luminous efficiency curve by a certain percentage, e.g., 10% or more, preferably 20% to 100%, to generate image data of an output display image.

In the transmissive display apparatus 10 of the invention, the display brightness acquiring section 15 (or the backside ambient light acquiring sensor 16 and the reflection brightness acquiring section 17), the observation distance acquiring sensor 18, and the ambient light acquiring sensor 20 may respectively detect and acquire the display brightness (or backside ambient light (brightness) and the reflection brightness of projection light), the observation distance, and ambient light (brightness) as external factors at preset time intervals, e.g., at intervals of 1 s to 10 min defined as updating timing and output the acquired backside ambient light, observation distance and ambient light to the calculating section 32, the calculating section 32 may calculate a visual sensitivity function CSF at the preset time intervals based on the display brightness (or the brightness of backside ambient light and projection light), the observation distance and the ambient light, and the image processing section 36 may subject an inverse function of the visual sensitivity function CSF calculated by the calculating section 32 to convolution operation at the preset time intervals, integrate the rate of change described above and perform image processing for adjusting a displayed image so that the displayed image has display spatial frequency characteristics identical or close to target spatial frequency characteristics.

In the transmissive display apparatus 10 of the invention, it is preferable to, in the memory 38, store a target visual sensitivity function corresponding to target spatial frequency characteristics and serving as the target or a target luminous efficiency curve represented as a target visual sensitivity function in advance, to cause the backside ambient light acquiring sensor 16, the observation distance acquiring sensor 18 and the ambient light acquiring sensor 20 to respectively acquire the display brightness (or the brightness of backside ambient light and projection light), the observation distance and ambient light as external factors at second time intervals different from, preferably not longer than first time intervals which herein refer to the above preset time intervals, for instance at intervals of 1 ms to 1 s defined as updating timing, to output the acquired display brightness (or the brightness of backside ambient light and projection light), observation distance and ambient light to the calculating section 32, to cause the calculating section 32 to calculate a visual sensitivity function CSF at the second time intervals based on the display brightness (or the brightness of backside ambient light and projection light), the observation distance and the ambient light, and to cause the image processing section 36 to perform image processing on image data of an input image at the time when a peak sensitivity of a luminous efficiency curve (preferably, f×S(u)) representing the visual sensitivity function CSF output from the calculating section 32 at the second intervals is shifted from a peak sensitivity of the target luminous efficiency curve or a peak sensitivity of a previous luminous efficiency curve by a certain percentage, e.g., 10% or more, the time being regarded as updating timing for image processing.

Figure 10A:
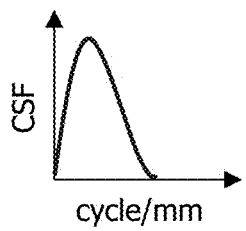
FIGS. 10A to 10C are respectively a graph showing a luminosity function at the time of getting in a vehicle, a graph illustrating the change of the luminosity function shown in FIG. 10A into a target luminosity function through adjustment by a driver, and a graph showing the target luminosity function after adjustment as shown in FIG. 10B, in connection with a display apparatus for vehicles of the present invention.
Figure 10B:
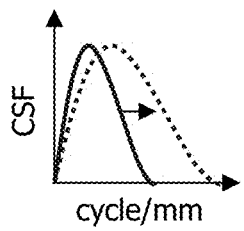
Figure 10C:
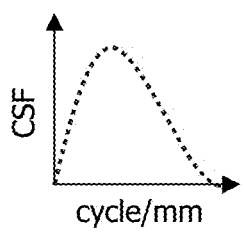

In the foregoing example, the external factors such as the display brightness (or the brightness of backside ambient light and projection light), the observation distance and ambient light are acquired, a visual sensitivity function CSF is obtained by the calculating section 32 based on those external factors, and the image processing is performed using an inverse function IF(CSF) of the visual sensitivity function CSF; however, the present invention is not limited thereto and may be configured so that the external factors such as the display brightness (or the brightness of backside ambient light and projection light), the observation distance and ambient light are acquired when an observer, for instance, in the case of a display apparatus for vehicles, a driver gets in a vehicle, a luminous efficiency curve (f×S(u)) representing a visual sensitivity function CSF calculated by the calculating section 32 is obtained in advance based on those external factors as shown in FIG. 10A, subsequently, as shown in FIG. 10B, the observer (driver), while observing, adjusts a displayed image on the display surface 14a of the display surface member 14 to an image with no contrast deterioration to adjust the luminous efficiency curve (f×S(u)) representing the visual sensitivity function CSF indicated by solid line in FIG. 10B to thereby obtain the luminous efficiency curve indicated by dashed line in FIG. 10B, the adjusted luminous efficiency curve as obtained is stored in the memory 38 as a favorable condition, and then, the image processing is performed on an input image by the image processing section 36 so that the adjusted luminous efficiency curve stored in the memory 38 indicated by dashed line in FIG. 100 is maintained during driving of the vehicle, thereby adjusting the contrast of a displayed image As the favorable condition, like the target spatial frequency characteristics of modes 1, 2 and 3 shown in FIGS. 9A to 9C, target luminous efficiency curves corresponding thereto may be previously set and stored in the memory 38 to be called up as needed.

For the updating timing for acquiring external factors and the updating timing for image processing, the updating timing, the first and second time intervals, the time when a peak sensitivity is shifted by a predetermined percentage (10%) as described above, and other timing may be applied.

The transmissive display apparatus 10 in the first embodiment of the invention is basically configured as above.

Next, a transmissive display apparatus 11 in a second embodiment of the invention shown in FIGS. 3 and 4 is described.

The transmissive display apparatus 11 in the second embodiment shown in FIGS. 3 and 4 has the same configuration as the transmissive display apparatus 10 in the first embodiment as shown in FIGS. 1 and 2 except that the transmissive display apparatus 11 includes a display unit 28 in place of the projection unit 12 and a display brightness acquiring section 30 in place of the display brightness acquiring section 15 (the backside ambient light acquiring sensor 16 and the reflection brightness acquiring section 17), so that like constituent elements are assigned by the same reference numerals and will not be described, and the following description will be mainly focused on different points.

As shown in FIGS. 3 and 4, the transmissive display apparatus 11 in the second embodiment of the invention includes the display unit 28, the display surface member 14 having the display surface 14a, the display brightness acquiring section 30, the observation distance acquiring sensor 18, the ambient light acquiring sensor 20, the image processing unit 22, and the input unit 24. The display unit 28 and the display surface member 14 constitute a display device 29 of the invention as with the transmissive display apparatus 10 in the first embodiment. The display device 29 is a transmissive display device that displays an image (displayed image) to be observed by an observer 26 as a translucent image.

Examples of the transmissive display apparatus 11 in this embodiment include display apparatuses for vehicles such as a mirror with image display function, a mirror with a built-in monitor, and a smart mirror, which are used as in-vehicle mirrors (not shown), and may also include augmented reality (AR) devices such as a head-up display (HUD), and display apparatuses for vehicles using such AR devices for use as display apparatuses for a car navigation systems, as with the transmissive display device 10 shown in FIG. 1.

The display unit 28 is a transmissive display on which the display surface member 14 is mounted and which, in order to display an input image, causes emitted imagewise light to enter the display surface member 14 from its backside and displays an image having passed through the display surface member 14, i.e., a translucent image on the display surface 14a. Any type of device may be used as the transmissive display as long as it can display an input image as a translucent image. Although a cathode ray tube (CRT) may be acceptable, a small size display is preferred, as with the transmissive display apparatus 10 shown in FIG. 1. Such a small size display is preferably composed of, for instance, a liquid crystal display (LCD), a reflective liquid crystal panel (liquid crystal on silicon (LCOS)), a holographic optical element and the like.

In this embodiment, the display surface member 14 is mounted on the display unit 28 and is configured to transmit emitted imagewise light (image light) from the display unit 28 entering from its backside to display an image (displayed image) on the display surface 14a and also configured to reflect ambient light entering from the front side.

Exemplary materials for the display surface member 14 in the second embodiment include a half mirror, a wavelength selective film, a transparent film, transparent resin materials such as acrylic resins, and a transparent glass, as with the transmissive display apparatus 10 shown in FIG. 1. In particular, a half mirror used for a mirror with image display function, a mirror with a built-in monitor, a smart mirror and the like, or a wavelength selective film is preferred. For instance, it is particularly preferable that such a half mirror or wavelength selective film be attached on and supported by an in-vehicle mirror (not shown) in use in the case of a display apparatus for vehicles or the like.

For such a half mirror or wavelength selective film, for example, a half mirror for displaying a projected image as disclosed in WO 2015/050202 A1, WO 2015/050203 A1 or WO 2015/050204 A1 filed by the applicant of the present application, or a half mirror comprising a laminate portion including a quarterwave plate and a circularly polarized light reflective layer for use in a mirror with image display function described in Japanese Patent Application No. 2015-137026 filed by the applicant of the present application is further preferred as with the transmissive display apparatus 10 shown in FIG. 1.

Such a half mirror for displaying a projected image preferably has visible light transmittance and includes at least one cholesteric liquid crystalline layer formed by immobilizing a cholesteric liquid crystalline phase as a selective reflection layer.

Preferably, the half mirror for displaying a projected image has three or more cholesteric liquid crystalline layers formed by immobilizing a cholesteric liquid crystalline phase and directly superposed on another, and the three or more cholesteric liquid crystalline layers exhibit different center wavelengths of selective reflection bands.

Preferably, the half mirror for displaying a projected image has a transparent medium on at least one surface of the selective reflection layer (cholesteric liquid crystalline layer), and the transparent medium has an inclined surface inclined at an angle of 1 to 30 degrees to the surface of the selective reflection layer facing the transparent medium.

Preferably, in the half mirror for displaying a projected image, a director of liquid crystal molecules forming a cholesteric liquid crystalline phase is uniform at a surface, facing a side on which projected images are displayed, of a cholesteric liquid crystalline layer closest to the side on which projected images are displayed.

In a half mirror for use in a mirror with image display function, at least one of a quarterwave plate and a circularly polarized light reflective layer preferably includes a layer formed of a liquid crystal composition containing a rod type (rod-like liquid crystal compound) and a discotic type (discotic liquid crystal compound), with a rod-like liquid crystal compound being more preferred.

In the above, preferably, the selective reflection layer or the circularly polarized light reflective layer includes two or more cholesteric liquid crystalline layers, and the two or more cholesteric liquid crystalline layers have different center wavelengths of selective reflection bands.

Preferably, the two or more cholesteric liquid crystalline layers are in direct contact with each other.

Preferably, the selective reflection layer or the circularly polarized light reflective layer includes three or more cholesteric liquid crystalline layers, and the three or more cholesteric liquid crystalline layers have different center wavelengths of selective reflection bands.

Preferably, the selective reflection layer or the circularly polarized light reflective layer include a cholesteric liquid crystalline layer having a center wavelength of a selective reflection band in a red wavelength region (e.g., 580 to 700 nm), a cholesteric liquid crystalline layer having a center wavelength of a selective reflection band in a green wavelength region (e.g., 500 to 580 nm), and a cholesteric liquid crystalline layer having a center wavelength of a selective reflection band in a blue wavelength region (e.g., 400 to 500 nm).

Preferably, in the selective reflection layer or the circularly polarized light reflective layer, a cholesteric liquid crystalline layer having a center wavelength of a selective reflection band of longer wavelength is disposed closer to an image display apparatus.

Preferably, the quarterwave plate is a layer formed by curing a liquid crystal composition containing a polymerizable liquid crystal compound.

Preferably, the quarterwave plate and the circularly polarized light reflective layer are in direct contact with each other.

Preferably, the display unit 28 and the quarterwave plate are bonded to each other via an adhesion layer.

The display brightness acquiring section 30 is configured to acquire the display brightness (light emission intensity or lightness) of the display device 29 made up of the display unit 28 and the display surface member 14 attached on the display unit 28. The display brightness acquiring section 30 is disposed at the display unit 28 to acquire the display brightness of a displayed image, i.e., a translucent image to be observed by the observer 26 when imagewise light emission by the display unit 28 passes through the display surface member 14 and the resulting translucent image is displayed on the display surface 14*a* as the displayed image. Any device may be used for the display brightness acquiring section 30 as long as it can acquire the display brightness (lightness) of the display device 29 made up of the display unit 28 and the display surface member 14. The display brightness acquiring section 30 may for example acquire the display brightness at the display surface 14*a* from the light emission brightness of the display unit 28, which is determined based on image data of an input image input to the display unit 28, and the transmittance of the display surface member 14. The brightness of light (image light) caused by imagewise light emission at the display unit 28, i.e., the light emission brightness can be previously calculated from image data of an input image input to the display unit 28 and is therefore known, and the transmittance of the display surface member 14 such as a half mirror or a wavelength selective film is also known. Accordingly, the display brightness acquiring section 30 can acquire the display brightness at the display surface 14*a* from the light emission brightness of emitted light as determined based on image data of an input image from the display unit 28, and the transmittance of the display surface member 14.

While the display brightness acquiring section 30 obtains the display brightness of the display device 29 using the light emission brightness of image light from the display unit 28 and the transmittance of the display surface member 14, a display brightness acquiring sensor such as a brightness sensor may be disposed at the front side (visually recognizable side) of the display surface 14*a* of the display surface member 14 to directly measure and detect the display brightness of the display device 29. One example of such a display brightness acquiring sensor is a luminance meter (CS-100A, available from Konica Minolta, Inc.). For the display brightness acquiring section 30, instead of directly detecting the display brightness of the display device 29 with a luminance meter, a camera may be used, and in this case, the display brightness may be calculated from image data of a shot image obtained by shooting a displayed image on the display surface 14*a* of the display device 29 with the camera, or calibrated image data of a shot image may be acquired as the display brightness.

In this embodiment, the image processing unit 22 is a GPU for, with the use of the display brightness of the display device 29 directly acquired by the display brightness acquiring section 30 in place of the display brightness acquired by the display brightness acquiring section 15 (or the backside ambient light (brightness) detected by the backside ambient light acquiring sensor 16 and the reflection brightness acquired by the reflection brightness acquiring section 17) in the transmissive display apparatus 10 shown in FIG. 1, performing image processing to adjust input spatial frequency characteristics of an input image input to the display unit 28 based on the display brightness, the observation distance detected by the observation distance acquiring sensor 18, and ambient light (brightness) acquired by the ambient light acquiring sensor 20 so that display spatial frequency characteristics of a displayed image on the display surface 14a as visually recognized under the conditions of the foregoing display brightness, observation distance and ambient light (brightness) agree with target spatial frequency characteristics serving as the target.

In other words, the image processing unit 22 preferably performs image processing on an input image, namely, image data thereof so that display spatial frequency characteristics of a displayed image agree with target spatial frequency characteristics or that the difference therebetween is minimized, to generate a processed image, i.e., image data of the displayed image, and outputs the processed image (image data of the displayed image) to the display unit 28. In addition, the image processing unit 22 preferably optimizes the contrast of a displayed image visually recognized so that the change from the contrast of an image having target spatial frequency characteristics is minimum.

It should be noted that the image processing performed by the image processing unit 22 in this embodiment is totally the same as that performed by the image processing unit 22 in the transmissive display apparatus 10 shown in FIG. 1 except that the image processing unit 22 in this embodiment uses the display brightness acquired by the display brightness acquiring section 30 instead of the display brightness acquired by the display brightness acquiring section 15 and that image data of an output image image-processed by the image processing unit 22 is output to the display unit 28 instead of the projection unit 12. Therefore, the image processing unit 22 is basically not described here except for different points that should be described.

In this embodiment, the calculating section 32 for CSF calculates a visual sensitivity function CSF based on the display brightness, the observation distance and ambient light (brightness).

Preferably, the display spatial frequency characteristics of a displayed image are obtained by, after performing image processing for input spatial frequency characteristics of an input image, subjecting a visual sensitivity function determined based on the display brightness, the observation distance and ambient light (brightness) to convolution operation.

In the transmissive display apparatus 11 in this embodiment, preferably, the display brightness acquiring section 30, the observation distance acquiring sensor 18 and the ambient light acquiring sensor 20 respectively acquire the display brightness, the observation distance and ambient light at preset updating timing for acquisition, e.g., at the first or second time intervals as described above, and output the acquired display brightness, observation distance and ambient light to the calculating section 32.

The calculating section 32 preferably calculates a visual sensitivity function CSF based on the display brightness, the observation distance and ambient light at the updating timing for acquisition.

Preferably, the image processing section 36 may subject an inverse function of a visual sensitivity function CSF output from the calculating section 32 at the updating timing for acquisition to convolution operation, integrate the rate of change described above, and perform image processing for adjusting a displayed image so that a displayed image has display spatial frequency characteristics identical or close to target spatial frequency characteristics, or may perform image processing on image data of an input image at the time when a peak sensitivity of a luminous efficiency curve (preferably, f×S(u)) representing a visual sensitivity function CSF output from the calculating section 32 at the updating timing for acquisition is shifted from a peak sensitivity of a target luminous efficiency curve or a peak sensitivity of a previous luminous efficiency curve by a certain percentage, e.g., 10% or more, the time being regarded as updating timing for image processing.

EXAMPLES

For the transmissive display apparatus 11 in the second embodiment of the invention, the change in contrast was obtained based on specific external factors in a specific environment.

In the second embodiment of the invention, visual sensitivity (contrast sensitivity (CS)) S(u) also changes depending on the light emission brightness (display brightness) of the display device, ambient light and the observation distance.

The visual sensitivity S(u) is defined by Formula (1) above.

Figure 11:
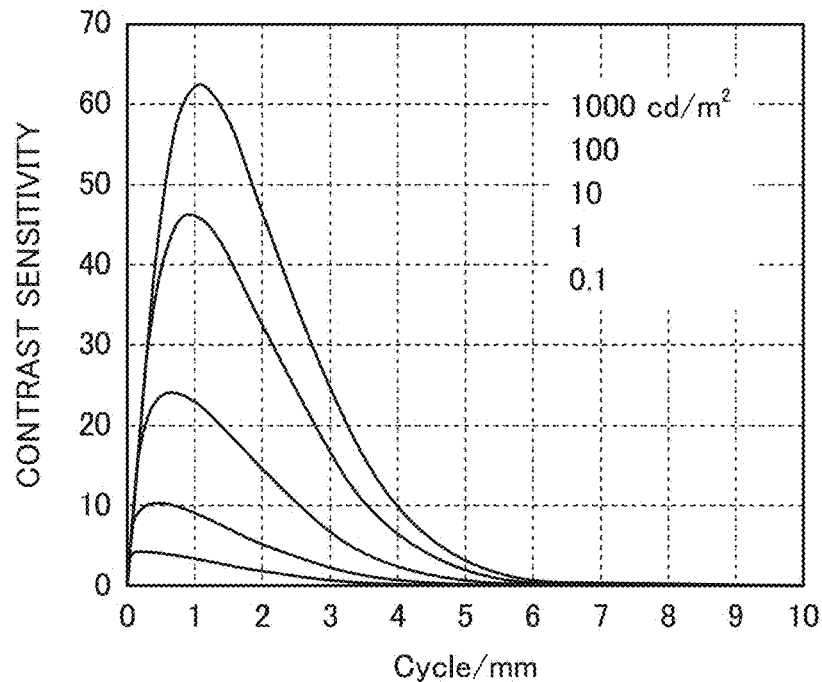
FIG. 11 is a graph showing the relationship between the display brightness and the visual sensitivity in examples of the invention.

In Formula (1), with an observation distance of 500 mm and an observation angle ($X_0$) defined as a solid angle of 60 mm×60 mm, when the display brightness L ranges from 0.1 to 1000 cd/m$^2$, the visual sensitivity (CS) S(u) can be presented as shown in FIG. 11.

FIG. 11 is a graph for explaining the change in visual sensitivity due to the display brightness, which is used in the present invention.

As can be seen from FIG. 11, for every display brightness ranging from 0.1 to 1000 cd/m$^2$, the visual sensitivity (CS) S(u) decreases in high and low spatial frequency regions and the peak sensitivity is exhibited in a spatial frequency region therebetween, i.e., a region of, in the illustrated example, 0 to 1.1 cycles/mm. In addition, the position of peak sensitivity is shifted to the higher spatial frequency side with increasing display brightness from 0.1 cd/m$^2$ to 1000 cd/m$^2$.

As described above, the influence on the luminosity function S(u) can be expressed by modeling ambient light with Formula (2) above as the correction coefficient f by which the luminosity function S(u) is multiplied.

The relationship between the change in contrast due to ambient light and the visual sensitivity (f×00 cd/m$^2$ S(u)) is shown in FIG. 12. In this case, the brightness Ls of ambient light was 9000 cd/m$^2$, the display brightness L was 500 cd/m$^2$ or 1000 cd/m$^2$, and the observation angle ($X_0$) was 60 mm×60 mm.

In regard to the visual sensitivity for each display brightness shown in FIG. 12, the peak sensitivity with the display brightness 1000 cd/m$^2$ was standardized to 1.0.

As can be seen from FIG. 12, whether the display brightness L is 500 cd/m$^2$ or 1000 cd/m$^2$, the visual sensitivity (CS) S(u) decreases in high and low spatial frequency regions and the peak sensitivity is exhibited in a spatial frequency region therebetween, i.e., a region of, in the illustrated example, 1 to 1.7 cycles/mm. In addition, the position of peak sensitivity with the display brightness L of 1000 cd/m$^2$ is shifted to the higher spatial frequency side compared to that with the display brightness of 500 cd/m$^2$. It would be understood that FIG. 12 shows the same tendency as in FIG. 11.

Subsequently, for two cases with the display brightnesses L of 500 cd/m$^2$ and 1000 cd/m$^2$, the change in contrast under the same conditions was obtained. The results thereof are shown in FIGS. 13A to 15D. The average value of 0-1 square wave for the transmittance of an input image is used as average brightness.

FIGS. 13A and 13B are a displayed image and a waveform graph representing the change in contrast when a square wave is input with the visual sensitivity associated with the spatial frequency u of 1 cycle/mm and the display brightness L of higher one, i.e., 1000 cd/m$^2$ in FIG. 12, while FIGS. 13C and 13D are a displayed image and a waveform graph representing the change in contrast when a square wave is input with the visual sensitivity associated with the spatial frequency u of 1 cycle/mm and the display brightness L of lower one, i.e., 500 cd/m$^2$ in FIG. 12.

As can be seen from the graph for the visual sensitivity for each display brightness shown in FIG. 12, when the spatial frequency u is 1 cycle/mm, the visual sensitivity associated with the display brightness L of higher one, i.e., 1000 cd/m$^2$ is about 0.95 and hence remarkably high. Therefore, the contrast is remarkably high, the amplitude of square wave is extremely large, and black and white stripes are clearly distinguishable. Thus, it can be said that the displayed image has high visibility and has been optimized.

On the other hand, in the case with the low brightness of 500 cd/m$^2$, the visual sensitivity is about 0.70 which is a high value and thus, the contrast is high, the amplitude of square wave is large, and black and white stripes are distinguishable; however, compared to the case with the high brightness of 1000 cd/m$^2$, the amplitude of square wave is smaller, the contrast is lower, and the distinguishability of black and white stripes is poorer.

Nevertheless, it still can be said that in both cases with high and low brightnesses, the displayed images have high visibility.

FIGS. 14A and 14B are a displayed image and a waveform graph representing the change in contrast when a square wave is input with the visual sensitivity associated with the spatial frequency u of 2 cycles/mm and the display brightness L of higher one, i.e., 1000 cd/m$^2$ in FIG. 12, while FIGS. 14C and 14D are a displayed image and a waveform graph representing the change in contrast when a square wave is input with the visual sensitivity associated with the spatial frequency u of 2 cycles/mm and the display brightness L of lower one, i.e., 500 cd/m$^2$ in FIG. 12.

As can be seen from the graph for the visual sensitivity for each display brightness shown in FIG. 12, when the spatial frequency u is 2 cycles/mm, the visual sensitivity associated with the display brightness L of higher one, i.e., 1000 cd/m$^2$ is about 0.80 and hence high. Therefore, the contrast is high, the amplitude of square wave is large, and black and white stripes are distinguishable. On the other hand, in the case with the low brightness of 500 cd/m$^2$, the visual sensitivity is about 0.60 which is a relatively high value and thus, the contrast is relatively high, the amplitude of square wave is relatively large, and black and white stripes are distinguishable; however, compared to the case with the high brightness of 1000 cd/m$^2$, the amplitude of square wave is smaller, the contrast is lower, and the distinguishability of black and white stripes is poorer.

In addition, compared to the case where the spatial frequency u is 1 cycle/mm, although the differences are small, the amplitude of square wave is smaller, the contrast is lower, and the distinguishability of black and white stripes is poorer in both cases with high and low brightnesses.

Nevertheless, it still can be said that in both cases with high and low brightnesses, the displayed images have high visibility.

FIGS. 15A and 15B are a displayed image and a waveform graph representing the change in contrast when a square wave is input with the visual sensitivity associated with the spatial frequency u of 5 cycles/mm and the display brightness L of higher one, i.e., 1000 cd/m$^2$ in FIG. 12, while FIGS. 15C and 15D are a displayed image and a waveform graph representing the change in contrast when a square wave is input with the visual sensitivity associated with the spatial frequency u of 5 cycles/mm and the display brightness L of lower one, i.e., 500 cd/m$^2$ in FIG. 12.

As can be seen from the graph for the visual sensitivity for each display brightness shown in FIG. 12, when the spatial frequency u is 5 cycles/mm, the visual sensitivities are about 0.07 with the display brightness L of higher one, i.e., 1000 cd/m$^2$ and about 0.05 with the display brightness L of lower one, i.e., 500 cd/m$^2$, and are thus remarkably low in both cases. Therefore, in both cases with high and low brightnesses, the amplitude of square wave is extremely small, the contrast is extremely low, and the stripes are not distinguishable. Thus it can be seen that the displayed images have extremely poor visibility.

It would be understood from above that, in both cases with high and low brightnesses, with the spatial frequency u of 5 cycles/mm, the amplitude of square wave is extremely small, the contrast is extremely low, the stripes are not distinguishable, and thus the displayed images have extremely poor visibility, whereas with the spatial frequency u of 1 cycle/mm or 2 cycles/mm, the contrast is high, the amplitude of square wave is large, black and white stripes are distinguishable, and thus the displayed images have high visibility.

On the grounds of above, the transmissive display apparatus of the invention can make images optimal for an observer, e.g., a user in terms of contrast by correcting input images based on the change in contrast as above. For example, once an observer sets the optimal conditions by oneself when getting in a vehicle, the contrast is automatically maintained afterward.

In the present invention, such correction processing may be performed on an entire displayed image or only on portions corresponding to, for instance, emergency vehicles or signs.

While in this embodiment, the case of displaying only a G channel of an RGB image display is described as an example, it is preferable to perform the optimal correction on each of R, G and B taking XYZ luminous efficiency into account. While in this embodiment, the optimal display is achieved by using the brightness as a parameter, it is apparent that the same optimization can be made with other parameters such as illuminance and lightness.

The transmissive display apparatus of the invention performs image correction for displaying images with the optimal contrast and is thus different from the conventional technique described in JP 2013-174667 A or other conventional art.

Accordingly, it is possible to display images and contents with excellent visibility and high contrast on a display surface of a display device according to the environment, condition, external factors, or other factors.

While the transmissive display apparatus according to the invention has been described above referring to various embodiments and examples, the invention is by no means limited to the above embodiments and examples, and various improvements and modifications may be made without departing from the scope and spirit of the invention.

What is claimed is:

1. A display apparatus comprising:

a display device including an imagewise light emitting unit configured to emit imagewise light for displaying an input image as a displayed image, and a display surface member that is disposed in a corresponding manner to the imagewise light emitting unit, that includes a display surface configured to reflect or transmit the input image resulting from emission of the imagewise light by the imagewise light emitting unit, to display the input image as the displayed image, and that is configured to transmit backside ambient light entering from a backside or reflect ambient light entering from a front side;

an observation distance acquiring sensor configured to detect an observation distance between the display surface and an observer who is observing the displayed image on the display surface of the display surface member of the display device;

a display brightness acquiring sensor configured to acquire display brightness of the display device observed by the observer;

an ambient light acquiring sensor configured to detect the ambient light of an environment at the front side from which the observer observes the displayed image on the display surface; and an image processing unit configured to perform image processing to adjust input spatial frequency characteristics of the input image input to the imagewise light emitting unit based on the display brightness acquired by the display brightness acquiring sensor, the observation distance detected by the observation distance-acquiring sensor, and the ambient light detected by the ambient light-acquiring sensor such that display spatial frequency characteristics of the displayed image as visually recognized under conditions of the display brightness, the observation distance and the ambient light agree with target spatial frequency characteristics serving as a target, wherein the display spatial frequency characteristics represent a relationship between a spectral intensity and a spatial frequency of the displayed image, and the input spatial frequency characteristics represent a relationship between a spectral intensity and a spatial frequency of the input image, wherein the imagewise light emitting unit is a projection unit emitting and projecting imagewise light of the input image onto the display surface of the display surface member of the display device, wherein the display surface member is disposed in a corresponding manner to the projection unit, the display surface member causing projection light of the input image projected by the projection unit to be reflected and displayed on the display surface as the displayed image, and transmitting the backside ambient light entering from the backside, wherein the display device is a projection type display device, and wherein the display brightness acquiring sensor includes a backside ambient light acquiring sensor configured to detect the backside ambient light entering from the backside of the display surface member and a reflection brightness acquiring section configured to acquire reflection brightness, at the display surface, of the projection light of the input image as emitted by the projection unit, the display brightness acquiring sensor obtaining the display brightness of the displayed image on the display surface using transmission brightness of the backside ambient light detected by the backside ambient light acquiring sensor and the reflection brightness of the projection light of the input image.

2. The display apparatus according to claim 1, wherein the display surface member is a half mirror or a wavelength selective film, wherein the projection unit is at least one of a liquid crystal display, a reflective liquid crystal panel and a holographic optical element, and wherein the display apparatus is one of a head-up display and an augmented reality device.

3. The display apparatus according to claim 1, wherein the display surface member includes:

a quarterwave plate and a circularly polarized light reflective layer as stacked in an order of the quarterwave plate and the circularly polarized light reflective layer from a side at which the imagewise light emitting unit is disposed, wherein the circularly polarized light reflective layer includes a cholesteric liquid crystalline layer in which a center wavelength of a selective reflection band is located within a visible light region, and wherein at least one of the quarterwave plate and the circularly polarized light reflective layer is a half mirror including a layer formed of a liquid crystal composition containing a discotic liquid crystal compound.

4. The display apparatus according to claim 1, wherein the target spatial frequency characteristics are the input spatial frequency characteristics.

5. The display apparatus according to claim 1, wherein the target spatial frequency characteristics are spatial frequency characteristics previously set or adjusted with respect to an initial spectrum of the input image.

6. The display apparatus according to claim 1, wherein the image processing unit performs image processing on image data of the input image such that a difference between the display spatial frequency characteristics of the displayed image and the target spatial frequency characteristics is minimum, and outputs image data of the displayed image.

7. The display apparatus according to claim 6, wherein the image processing unit optimizes contrast of the displayed image visually recognized such that change from contrast of an image having the target spatial frequency characteristics is minimum.

8. The display apparatus according to claim 1, wherein the display spatial frequency characteristics of the displayed image are obtained by, after performing the image processing for the input spatial frequency characteristics of the input image, subjecting a visual sensitivity function determined based on the display brightness, a viewing angle of the display surface of the imagewise light emitting unit with the observation distance and the ambient light to convolution operation, and wherein the image processing unit subjects an inverse function of the visual sensitivity function to convolution operation with respect to the input spatial frequency characteristics of the input image and performs correcting operation for correcting change between the target spatial frequency characteristics and the input spatial frequency characteristics, as the image processing.

9. The display apparatus according to claim 8, wherein the visual sensitivity function is calculated using a product f×S(u) of a luminosity function S(u) represented by Formula (1) and a correction coefficient f represented by Formula (2):

$$S(u) = \frac{\left(5200 e^{-0.0016 u^2 (1+100/L)^{0.08}}\right)}{\sqrt{\left(1 + \frac{144}{X_0^2} + 0.64 u^2\right)\left(\frac{63}{L^{0.83}} + \frac{1}{1 - e^{-0.02 u^2}}\right)}} \quad (1)$$

$$f = e^{-\frac{\ln^2\left(\frac{L_s}{L}\left(1+\frac{144}{X_0^2}\right)^{0.25}\right) - \ln^2\left(\left(1+\frac{144}{X_0^2}\right)^{0.25}\right)}{2\ln^2(32)}} \quad (2)$$

where u is a spatial frequency (cycle/deg); L is the display brightness (cd/m$^2$); Ls is brightness (cd/m$^2$) of ambient light; and $X_0$ is the viewing angle (deg) of the display surface of the imagewise light emitting unit with the observation distance.

10. The display apparatus according to claim 1, wherein the image processing unit includes:
a memory configured to store the target spatial frequency characteristics;
a calculator configured to calculate a visual sensitivity function based on the display brightness, the viewing angle of the display surface of the imagewise light emitting unit with the observation distance and the ambient light;
a target comparison calculator configured to compare the target spatial frequency characteristics stored in the memory and the input spatial frequency characteristics of the input image to obtain a rate of change therebetween; and
an image processing section configured to subject an inverse function of the visual sensitivity function calculated by the calculator to convolution operation with respect to the input spatial frequency characteristics of the input image, integrate the rate of change obtained based on a comparison result between the target spatial frequency characteristics and the input spatial frequency characteristics compared by the target comparison calculator to obtain the display spatial frequency characteristics of the displayed image, and perform the image processing on image data of the input image such that the display spatial frequency characteristics agree with the target spatial frequency characteristics.

11. The display apparatus according to claim 10, wherein the memory further stores a target visual sensitivity function corresponding to the target spatial frequency characteristics and serving as a target or a target luminous efficiency curve represented as the target visual sensitivity function, and
wherein the image processing section performs the image processing on the image data of the input image at preset time intervals or at a time when a peak sensitivity of a luminous efficiency curve representing the visual sensitivity function calculated by the calculator is shifted from a peak sensitivity of the target luminous efficiency curve by a certain percentage.

12. The display apparatus according to claim 10, wherein the display brightness acquiring sensor, the observation distance acquiring sensor and the ambient light acquiring sensor respectively detect the display brightness, the viewing angle of the display surface of the imagewise light emitting unit with the observation distance and the ambient light and output the detected display brightness, observation distance and ambient light to the calculator at preset time intervals, wherein the calculator calculates the visual sensitivity function at the preset time intervals based on the display brightness, the observation distance and the ambient light respectively output from the display brightness acquiring-sensor, the observation distance acquiring sensor and the ambient light acquiring sensor, and
wherein the image processing section subjects an inverse function of the calculated visual sensitivity function to convolution operation, integrates the rate of change to obtain the display spatial frequency characteristics of the displayed image, and performs the image processing such that the displayed image has the obtained display spatial frequency characteristics, at the preset time intervals.

13. The display apparatus according to claim 10, wherein the memory further stores a target visual sensitivity function corresponding to the target spatial frequency characteristics and serving as a target or a target luminous efficiency curve represented as the target visual sensitivity function,
wherein the display brightness acquiring sensor, the observation distance acquiring sensor and the ambient light acquiring sensor respectively detect the display brightness, the viewing angle of the display surface of the imagewise light emitting unit with the observation distance and the ambient light and output the detected display brightness, observation distance and ambient light to the calculator at second preset time intervals,
wherein the calculator calculates the visual sensitivity function at the second preset time intervals based on the display brightness, the observation distance and the ambient light respectively output from the display brightness acquiring sensor, the observation distance acquiring sensor and the ambient light acquiring sensor, and
wherein the image processing section performs the image processing on the image data of the input image at a time when a peak sensitivity of a luminous efficiency curve representing the visual sensitivity function output from the calculator at the second preset time intervals is shifted from a peak sensitivity of the target luminous efficiency curve by a certain percentage.

14. The display apparatus according to claim 10, wherein the target comparison calculator calculates, as the rate of change, a ratio between an intensity of an output image serving as a target and an intensity of the input image for each spatial frequency.

15. The display apparatus according to claim 10, wherein the image processing section subjects the image data of the input image to image processing involving multiplying the input spatial frequency characteristics of the input image by the inverse function of the visual sensitivity function in a spatial frequency space, thereby generating image data of an output image.

16. The display apparatus according to claim 1, further comprising at least one of a characteristics adjusting section, a characteristics setting section and a characteristics inputting section,
the characteristics adjusting section being used to previously determine the target spatial frequency characteristics by previously adjusting brightness of the displayed image observed by the observer, while observing the displayed image which is displayed on the display surface of the display surface member by the imagewise light emitting unit in accordance with the display brightness, the observation distance and the ambient light, in order to store the target spatial frequency characteristics in the memory, the characteristics setting section being used by the observer to previously set the target spatial frequency characteristics, and the characteristics inputting section being used by the observer to previously input the target spatial frequency characteristics set by the observer.

17. The display apparatus according to claim 1, wherein the image processing unit adjusts the input spatial frequency characteristics of the input image such that a function or graph indicative of a relationship between a spectral intensity and a spatial frequency of the displayed image, that is, of the display spatial frequency characteristics of the displayed image agrees with a function or graph indicative of a target relationship between a spectral intensity and a spatial frequency, that is, of the target spatial frequency characteristics.

* * * * *